United States Patent
Pajjuri et al.

(10) Patent No.: US 11,551,652 B1
(45) Date of Patent: Jan. 10, 2023

(54) HANDS-ON ARTIFICIAL INTELLIGENCE EDUCATION SERVICE

(71) Applicant: Amazon Technologies, Inc., Seattle, WA (US)

(72) Inventors: Ambika Pajjuri, Palo Alto, CA (US); Nagajyothi Nookula, Irvine, CA (US); Rahul Suresh, Mountain View, CA (US); Sunil Mallya Kasaragod, San Francisco, CA (US); Richard Lee, San Jose, CA (US); Hsin Chieh Chen, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 16/897,094

(22) Filed: Jun. 9, 2020

Related U.S. Application Data

(60) Provisional application No. 62/941,559, filed on Nov. 27, 2019.

(51) Int. Cl.
*G10H 1/00* (2006.01)
*G06N 3/04* (2006.01)
*G06N 3/08* (2006.01)

(52) U.S. Cl.
CPC .......... *G10H 1/0025* (2013.01); *G06N 3/0454* (2013.01); *G06N 3/088* (2013.01); *G10H 2210/111* (2013.01); *G10H 2220/116* (2013.01); *G10H 2220/221* (2013.01)

(58) Field of Classification Search
CPC ........... G10H 1/0025; G10H 2210/111; G10H 2220/116; G10H 2220/221; G06N 3/0454; G06N 3/088

USPC .......................................................... 84/609
See application file for complete search history.

(56) References Cited

U.S. PATENT DOCUMENTS

| 6,993,532 | B1 * | 1/2006 | Platt | G06F 16/639 |
| | | | | 707/916 |
| 7,777,125 | B2 * | 8/2010 | Platt | G06F 16/635 |
| | | | | 84/649 |
| 10,460,235 | B1 * | 10/2019 | Truong | G06F 40/20 |
| 10,909,604 | B1 * | 2/2021 | Zappella | G06Q 30/0623 |
| 11,120,364 | B1 * | 9/2021 | Gokalp | G06N 20/00 |
| 11,134,310 | B1 * | 9/2021 | Argenti | H04N 21/458 |

(Continued)

FOREIGN PATENT DOCUMENTS

| CN | 110136678 A * | 8/2019 | G06N 20/00 |
| EP | 3620991 A1 * | 3/2020 | G06F 17/10 |

(Continued)

OTHER PUBLICATIONS

U.S. Appl. No. 16/698,801, filed Nov. 27, 2019, Liang Li et al.

(Continued)

*Primary Examiner* — Christina M Schreiber
(74) *Attorney, Agent, or Firm* — Robert C. Kowert; Kowert, Hood, Munyon, Rankin & Goetzel, P.C.

(57) ABSTRACT

Indications of sample machine learning models which create synthetic content items are provided via programmatic interfaces. A representation of a synthetic content item produced by one of the sample models in response to input obtained from a client of a provider network is presented. In response to a request from the client, a machine learning model is trained to produce additional synthetic content items.

20 Claims, 14 Drawing Sheets

(56) References Cited

U.S. PATENT DOCUMENTS

| | | | |
|---|---|---|---|
| 11,182,691 B1 * | 11/2021 | Zhang | G06N 20/00 |
| 11,200,511 B1 * | 12/2021 | London | G06N 20/00 |
| 11,211,058 B1 * | 12/2021 | Eakin | G10L 15/197 |
| 11,295,745 B1 * | 4/2022 | Roy | G10L 15/30 |
| 11,335,347 B2 * | 5/2022 | Aguilar Alas | G10L 25/63 |
| 2005/0241465 A1 * | 11/2005 | Goto | G06F 16/438 |
| | | | 84/616 |
| 2015/0137994 A1 * | 5/2015 | Rahman | H04Q 9/04 |
| | | | 340/870.07 |
| 2015/0206221 A1 * | 7/2015 | Kendrick | G06Q 30/0631 |
| | | | 705/26.7 |
| 2015/0379072 A1 * | 12/2015 | Dirac | G06N 20/00 |
| | | | 707/693 |
| 2015/0379429 A1 * | 12/2015 | Lee | G09B 5/00 |
| | | | 706/11 |
| 2016/0078361 A1 * | 3/2016 | Brueckner | H04L 67/10 |
| | | | 706/12 |
| 2016/0196812 A1 * | 7/2016 | Rashad | G10H 1/0025 |
| | | | 84/609 |
| 2018/0286462 A1 * | 10/2018 | Becherer | G11B 27/036 |
| 2019/0333219 A1 * | 10/2019 | Xu | G06T 5/001 |
| 2019/0385064 A1 * | 12/2019 | Malaya | G06N 3/0454 |
| 2020/0073968 A1 * | 3/2020 | Zhang | G06N 3/08 |
| 2021/0357745 A1 * | 11/2021 | Wallis | G06N 3/0454 |
| 2022/0059063 A1 * | 2/2022 | Balassanian | G06N 3/088 |
| 2022/0093101 A1 * | 3/2022 | Krishnan | G06V 40/168 |

FOREIGN PATENT DOCUMENTS

| | | | | |
|---|---|---|---|---|
| JP | 2017524183 A | * | 8/2017 | |
| WO | 2018184187 | | 10/2018 | |
| WO | WO-2018184187 A1 | * | 10/2018 | G06K 9/00986 |
| WO | 2019209820 | | 10/2019 | |
| WO | WO-2019209820 A1 | * | 10/2019 | G06F 17/18 |
| WO | 2019238712 | | 12/2019 | |
| WO | WO-2019238712 A1 | * | 12/2019 | A61B 1/00009 |
| WO | 2020014490 | | 1/2020 | |
| WO | WO-2020014490 A1 | * | 1/2020 | G02B 27/0012 |

OTHER PUBLICATIONS

Magenta, "Make Music and Art Using Machine Learning", Retrieved from https://magenta.tensorflow.org on Apr. 14, 2020, pp. 1-5.

Catherine Clifford, "Make music that sounds like Bach with Google's first-ever A.I.-powered Googl Doodle", Retrieved from https://www.cnbc.com/2019/03/22/make-music-that-sounds-like-bach-with-googles-first-ever-ai-powered-google-doodle.html on Apr. 14, 2020, pp. 1-8.

* cited by examiner

GAI algorithms/model types 400
provided as alternatives for exploration

Generative adversarial networks (GANs) 412

Variational auto-encoders 422

Auto-regressive models 432

Transformer models 442

Hands-on teaching features 700

Real-time audio playback of generated music examples 702

Dynamic switching between model types 704 (e.g., GAN vs VAE)

Graphical selection of hyper-parameter combinations 706

Graphical control of randomization inputs (e.g., z vector) 708

Graphical interfaces for viewing model components/structures 710 (e.g., number and types of neural network layers)

Visual representation of similarity metrics 712 (e.g., between results achieved in respective iterations, indicative of extent of convergence towards objective)

Fully-commented example source code, parameters, tutorials 714

Simplified notebook interfaces 716 (no setup or pre-allocation of resources required)

Music composition 1204

Graphic arts composition 1208

Writing 1212

Synthetic example generation for medicine-related ML models 1216

Video games/animation 1220

HANDS-ON ARTIFICIAL INTELLIGENCE EDUCATION SERVICE

This application claims benefit of priority to U.S. Provisional Application No. 62/941,559 filed Nov. 27, 2019, titled "Hands-on Artificial Intelligence Education Service," which is hereby incorporated by reference in its entirety.

BACKGROUND

In recent years, machine learning has increasingly been used for addressing problems in a number of domains. The sophistication of the machine learning techniques being used for such tasks as classification, object recognition, fraud detection, and the like has increased to the point that it is often difficult even for technically-adept individuals to understand how the techniques work. As a result, the set of qualified individuals who can help high-quality develop machine learning models remains relatively small.

In contrast to many traditional machine learning approaches, which may be referred to as "discriminative artificial intelligence," the term "generative artificial intelligence" refers to a set of machine learning techniques that enable human-like creative tasks to be performed with the help of machine learning models. Whereas traditional discriminative machine learning typically makes predictions or inferences based on analysis of input data, humans can collaborate with generative artificial intelligence tools to create new digital works such as music, art, or even stories. As such, computing systems at which generative artificial intelligence algorithms are implemented may be considered part of the creative process. Applications of generative artificial intelligence include accelerating product development by automatically turning rough sketches into images or three-dimensional designs, generating synthetic records which can be used to train other machine learning models to help diagnose diseases, and so on.

Generative artificial intelligence techniques are typically extremely complex, however. They typically require deep knowledge of specialized methods, and in some cases may require multiple machine learning models to be trained together, requiring rare combinations of skills. Individuals interested in becoming fluent in generative and other similar artificial intelligence techniques may either have to try to stay abreast of fast moving and often extremely theoretical academic literature, or delve into online resources which are often dry and difficult to generalize.

BRIEF DESCRIPTION OF DRAWINGS

FIG. 4 illustrates example generative learning algorithms which may be employed at an artificial intelligence education service, according to at least some embodiments.

FIG. 7 lists examples of hands-on teaching features which may be implemented at an artificial intelligence education service, according to at least some embodiments.

FIG. 12 illustrates example domains for which respective generative models may be utilized at an artificial intelligence education service, according to at least some embodiments.

Figure 1:
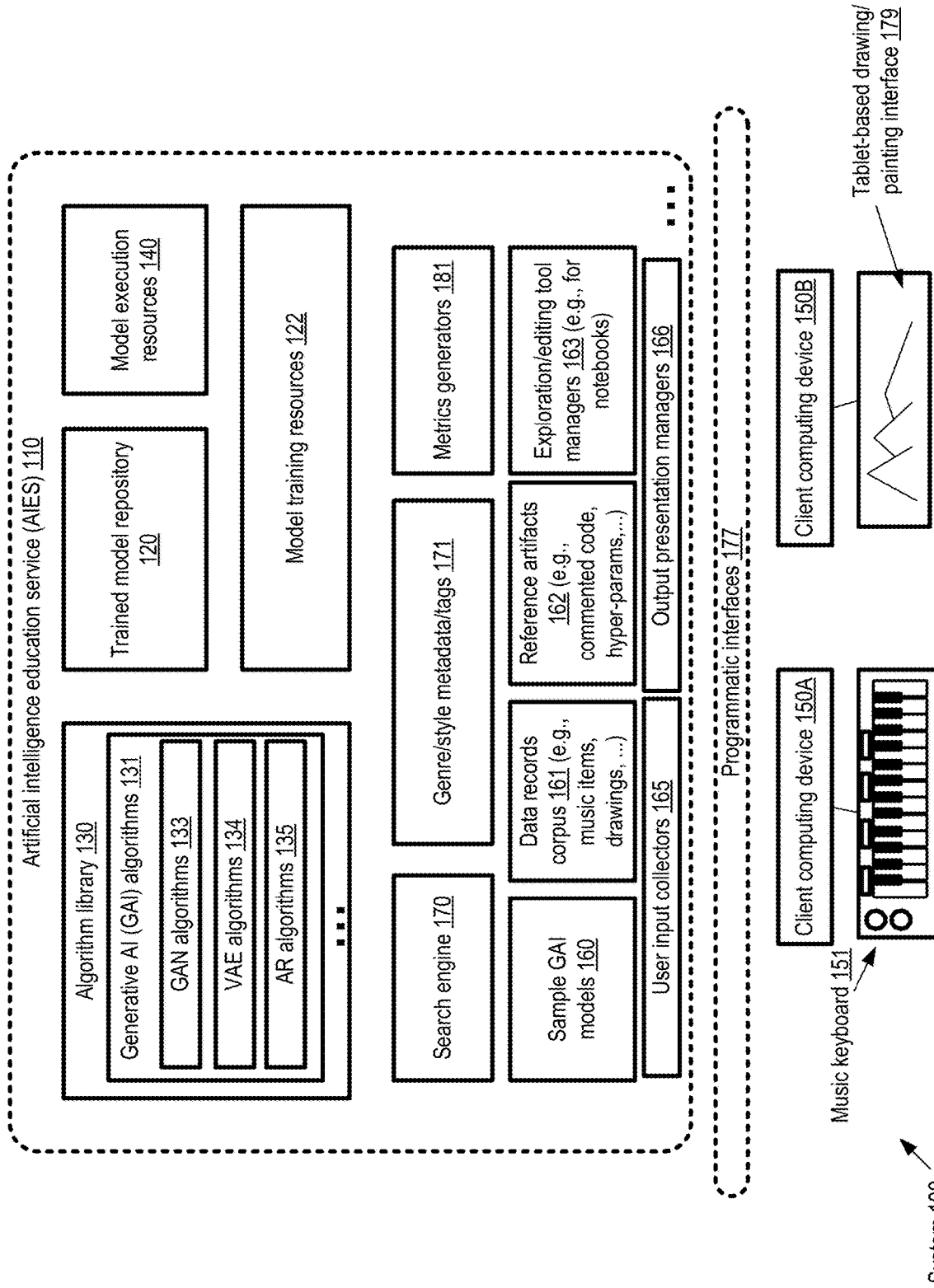
FIG. 1 illustrates an example system environment in which a network-accessible artificial intelligence education service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing a network-accessible artificial intelligence education service which provides a number of easy-to-use hands-on interfaces, enabling users to familiarize themselves with and experiment with various aspects of complex machine learning techniques including generative artificial intelligence. As a result of using such a service, individuals with limited or no prior knowledge of machine learning may soon become conversant with artificial intelligence methodologies, and even initiate the training of customized models which can then be used to produce real-world results. For example, amateur and/or professional musicians may be able to quickly generate unique new music of a desired style, visual artists or graphic designers may be able to develop new artwork, video games and the like, and health scientists may be able to generate synthetic data that can be used to improve disease detection and prediction tools. In at least some embodiments, such an artificial intelligence education service (AIES) may be implemented as part of a suite of services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. In some embodiments, a provider network may include a machine learning service (MLS) in addition to the AIES, which may be used to help train and/or run models used by the AIES or to provide some of the easy-to-use interfaces used by the AIES. The AIES may also be referred to as an artificial intelligence education facilitation service or an artificial intelligence education acceleration service, as it may significantly reduce the time taken by learners to become fluent in various artificial intelligence (AI) techniques.

In some embodiments, the focus of an AIES may comprise one or more selected sub-fields of machine learning which are exceptionally complex, such as generative artificial intelligence (GAI) techniques. The terms generative AI and generative machine learning may be used interchangeably herein. Whereas traditional (non-generative) machine learning typically makes predictions or inferences based on analysis of input data, humans may collaborate with GAI tools to create new digital works such as music, art, and the like. This creative potential makes GAI an especially attractive entry point to introduce users to machine learning concepts, as the AIES may be able to demonstrate the benefits and impacts of various factors by, for example, playing generated music or displaying generated artwork based on input obtained from users. In many of the example scenarios discussed herein, GAI models that can create new music derived (at least partly) from short user-provided music items created using a simple electronically-connected musical instrument (such as a music keyboard connected as a peripheral device to a user's laptop or desktop) are used for educating the users regarding various aspects of machine learning. Note that the AIES may utilize other types of content and/or other types of models as part of its educational methodology in at least some embodiments; music-producing GAI models represents just one example approach. In order to make it easy and fun for users to learn about machine learning, the AIES may rely on a number of sophisticated technical algorithms and techniques under the covers in various embodiments—e.g., algorithms that quickly transform music or other content items to graphical representations that enable the demonstration of progress being made during model training or the comparison of different examples, visualization algorithms that clearly indicate the respective results of multiple stages of a machine learning pipeline, presentation interfaces that enable easy drill downs into details of complex neural networks and other models, real-time if/then comparisons showing the impact of different model meta-parameter combinations or model types, and so on. The complex technical details of the underlying algorithms may be kept hidden from the users (at least initially); for example, in some embodiments, user may not even have to examine or modify any source code to generate their own customized generative models. The output items created using GAI tools and models may be referred to as synthetic content items in at least some embodiments.

In embodiments in which music creation is used as the example GAI application for acceleration teaching of machine learning concepts, users may be able to utilize either on-screen representations of a musical instrument (e.g., a virtual music keyboard shown on the screen) presented programmatically from the AIES, or connect a simple electronically-connected musical instrument to a computing device which is in turn connected to the AIES via the Internet. AIES users, also referred to as AIES clients, may begin by providing a few notes of music as input to one or more sample GAI models that create corresponding synthetic music items, which may be played back to the user to provide immediate feedback regarding the results achieved using the models. Clients may select or change the preferred genre (e.g., "jazz", "rock", etc.) of music of the desired output, and the system may immediately play the synthesized music corresponding to that genre. Clients may view meta-parameters and other artifacts of the models being used, and/or the training data which was used for the sample models, or even examine well-commented source code or pseudo-code of the models, if desired. The clients may eventually become familiar enough to make suggestions, via easy-to-use interfaces, to select training data for a new model, and may then be guided through the training iterations of the model by the AIES. The AIES may provide classification metadata (such as respective tags and metrics for various music items of a corpus) as well as a sophisticated search engine, which can be used by clients to select examples for inclusion in a training data set.

In at least some embodiments, to further explicate the training process, the AIES may use sophisticated content transformation techniques to present visual (or multi-modal) representations of the improvements or changes in the model as training progresses—e.g., visual similarity/difference representations may be generated and presented with respect to the output content produced in different training iterations. As the clients gain more confidence, they may try changing meta-parameters (or the training data set) and re-training models. In some cases, if desired, the clients may view and/or modify source code of the models to be trained, although accessing the source code may not be required to train custom versions of the model—e.g., such custom versions may be obtained simply by selecting a unique training data set and/or tweaking meta-parameters. Eventually, in at least some embodiments, a client may decide that the quality of the content generated by a particular model trained on behalf of the client is high enough, and the trained model may be stored. In one embodiment, the AIES may enable clients such as musicians to publish the content generated using their versions of the models, e.g., at a web-based music sharing or distribution site, and/or to participate in competitions for compute-generated content items. The techniques learned by clients using the AIES may be transferred to various problem domains in different embodiments, such as for generating synthetic medical records that can be used to train disease detection machine learning models, speeding up engineering/design projects by quickly converting rough sketches into engineering drawings, and so on.

As one skilled in the art will appreciate in light of this disclosure, certain embodiments may be capable of achieving various advantages, including some or all of the following: (a) substantially speeding up the process of educating interested parties in various aspects of artificial intelligence and machine learning, by providing hands-on training using interfaces that make learning fun; (b) improving the overall quality of machine learning solutions developed, by rapidly increasing the pool of competent practitioners, and (c) by exposing the internal details of various machine learning models, increasing the overall trust level of the public with regard to machine learning tools and applications in general.

According to some embodiments, a system may comprise one or more computing devices, e.g., of a network-accessible AIES of a provider network. The devices may include instructions that upon execution on or across one or more processors cause the one or more computing devices to provide, via one or more interactive programmatic interfaces (such as graphical or web-based interfaces), an indication of (a) one or more sample models implementing respective generative machine learning algorithms trained to create synthetic content items of a particular content type (such as music, drawing, fiction text or the like) and (b) metadata associated with the one or more sample models, such as the names of the algorithms used in the models, respective hyper-parameters of the different models, structural details of the models (such as the number and types of neural network layers), etc. Respective representations of (a) a first synthetic content item generated at a particular sample model (e.g., one of the sample models selected by a client) in response to a first input content item and (b) a second synthetic content item generated at the particular sample model in response to a second input content item may be provided, enabling a client or user to get a high-level sense of the creative capabilities of the selected model.

The user may explore various other aspects of the sample models via the programmatic interfaces in various embodiments, e.g., experimenting with the impacts of changing various properties of input content types or the model hyper-parameters, and may eventually decide to begin the process of training a specific customized model. A plurality of training iterations of a custom generative machine learning model may then be conducted, e.g., using resources of a provider network. In some embodiments, the AIES may obtain access to a large corpus of content items (e.g., songs and other types of music performances) which can be used to generate tailored training data sets for the generative models. The AIES may implement one or more algorithms to characterize the corpus elements along a plurality of dimensions (e.g., whether and to what extent a particular musical performance is a "jazz" performance, a "blues" performance, the mood or psychological feelings the musical performance is likely to engender in listeners, which instruments or voice types are used, how many instruments are used, and so on), and produce classification tags for individual content items using such algorithms. Classification tags may also be collected at the AIES from other sources—e.g., public databases may provide such information as the year a particular performance was recorded, the country it as recorded in, whether it is part of a soundtrack of a film, and so on, and tags indicative of such information may also be made available to clients of the AIES if desired. A client may submit programmatic requests indicating which specific tags and/or other metadata of the content items of the corpus are to be used to select a training data set for the custom model in at least some embodiments.

The provider network resources used for training the model on behalf of the client may include for example, training resources managed by a machine learning service, one or more software containers of a container management service, compute instances of a virtualized computing service, storage instances of an object storage service, and so on in different embodiments. In at least some embodiments, sophisticated content analysis and transformation tools may be used to convert content items of one domain (e.g., music) into objects that are easier to compare visually (e.g., graphical representations of the music, indicating where a particular music piece lies with respect to typical representative music pieces of various genres) to help illustrate the changes in the model as the training iterations proceed. For example, even in the scenario in which the training iterations' input and output records are all music pieces or performances (and are thus not inherently graphical or visual in nature), graphical representations of the differences between output produced in one training iteration for a given input record and another iteration for the same input record may be presented to the client in at least some embodiments. After the training is completed, the trained version of the model may be stored and used to generate new content based on input which was not part of the training data set in various embodiments. The AIES may enable clients to save, and generate versions of, content items generated by client-selected models in at least some embodiments. For example, with respect to music, one or more editable or read-only file formats (e.g., mp3, way etc.) may be selected by the clients for the musical items produced by their customized models.

Any of a variety of types of generative machine learning models may be used in different embodiments at an AIES, including but not limited to generative adversarial networks (GANs), variational auto-encoders (VAEs), auto-regressive models, transformers and the like. According to some embodiments, a client may be able to try out different model types for the same input—e.g., the same set of notes may be provided as input to a GAN model, a VAE model and so on to see how different the outputs from the different models sound. In at least some embodiments, the AIES may provide not only the values of various model hyper-parameters to clients exploring or experimenting with the models, but also present simple graphical interface elements such as sliders, knobs or the like which can be used to graphically modify at least hyper-parameters if desired for additional training or to execute trained versions of the models. In some embodiments, the AIES may recommend or suggest changes to try, e.g., based on feedback received from the client regarding the content output being generated. For example, the client may indicate, via a programmatic interface, that the pace of a particular output music piece is too slow for the client's liking, and the AIES may suggest changes to one or more hyper-parameters to help speed up the music being produced. In at least one embodiment, a client may be provided interface elements to switch or substitute between different instrument combinations to be used for output music items—e.g., if desired, a client may be allowed to change the model hyper-parameters (or training data) to include electric guitar sounds instead of acoustic guitar sounds. In some embodiments, the AIES may offer recommendations for correcting input provided by a client—e.g., if the client attempts to provide a well-known melody to be used as input for generating a synthetic music content item, and one or more of the notes provided by the client differs from an expected note, the AIES may present a message to the client indicating that the expected note may be preferable, and change the note if the client agrees. In at least one embodiment, the AIES may offer similar recommendations regarding the output produced by a model trained on behalf of the client—e.g., if the sequence of notes produced by the model does not meet a euphony or harmony criterion of the AIES, the AIES may suggest changes (e.g., to the hyper-parameters of the model, or to the output itself) to the client.

Special interactive interfaces for machine learning tasks, referred to as notebooks, may be presented by an AIES in at least some embodiments to enable exploration, annotation and/or modification of models, training data, and other artifacts. In at least one embodiment, an AIES may utilize a computing service of a provider network, such as a virtualized computing service or a server-less dynamic provisioning computing service implementing a functional programming methodology to implement such notebook interfaces.

A number of different subjective and/or objective metrics may be generated for comparing content items produced by a generative model (e.g., in respective training iterations, or in response to different input records) at the AIES in some embodiments. In the music domain, generating such metrics may involve, for example, generating structural similarity matrices from music items, identifying the number and types of instruments used, the number and types of voices (e.g., soprano, baritone etc.) used, the pacing of notes, the ratio of notes that qualify as belonging to a particular genre such as rock versus jazz, beat patterns of any percussion instruments used, and so on.

In various embodiments, the AIES may provide annotated and thoroughly-commented versions of reference/sample source code of various model and hyper-parameter files, enabling those clients who wish to examine such artifacts to do so at their leisure. In at least one embodiment, editing interfaces (e.g., what-you-see-is-what-you-get or WYSIWIG interfaces) may be provided to allow clients to edit source code or other metadata, and save (or download) their custom versions if desired. In one embodiment, the AIES may provide integrations with one or more code management of software development services or repositories, e.g., implemented as services of a provider network or Internet-accessible web-sites, at which AIES clients may store customized machine learning artifacts generate during their experimentation at the AIES. Step-by-step tutorials may be provided by the AIES for learning about various types of machine learning algorithms and techniques in some embodiments.

According to at least one embodiment, an AIES client may submit selected favorite music items (e.g., compositions from a favorite artist) or other content, and request that the provided content be used to help train one or more generative machine learning models. In some embodiments, if/when training examples for a custom version of a model is to be identified, the AIES may provide a like/dislike interface enabling a client to indicate their preferences for AIES-presented music examples. The client may listen to each of several songs or music items of the AIES's corpus, and provide "like" or "don't-like" feedback about each. As the client indicates more preference feedback (i.e., as more data regarding the likes and dislikes of the client becomes known to the AIES), the AIES may be able to generate a profile of the kinds of music to be included in the training data set; as such, a training data set based on the client's preferences may eventually be generated without requiring the clients to use words to describe qualities of the music to be incorporated in the training data.

Example System Environment

FIG. 1 illustrates an example system environment in which a network-accessible artificial intelligence education service may be implemented, according to at least some embodiments. As shown, system 100 includes various resources and artifacts of an artificial intelligence education service (AIES) 110 at which generative AI (GAI) algorithms and models are used to help teach clients via hands-on techniques about various aspects of artificial intelligence.

The AIES 110 may implement one or more programmatic interfaces 177 in the depicted embodiment, such as web-based consoles, graphical user interfaces and the like, which may be used by clients to interact with the AIES in various ways. In some embodiments, the programmatic interfaces 177 may include application programming interfaces (APIs) and/or command-line tools, which may for example be invoked by the web-based consoles or graphical user interfaces—for example, an interaction of a client with an element of a graphical user interface or web-based console may result in the invocation or execution of an underlying API call.

As an entertaining introduction to various technical aspects of AI, the AIES 110 may provide access to one or more sample GAI models 160 in the depicted embodiment. For example, in one embodiment, one of the sample models may be presented via interfaces 177 as a "rock music" generator, while another may be presented as a "classical music" generator. In one simple type of interaction, an AIES client may submit a few notes of music as input to a selected sample model 160, and obtain an indication (e.g., a playback) of the output produced by the selected model for that input. In at least some embodiments, a music keyboard 151, connected for example via USB (Universal Serial Bus) or some other peripheral connector to a client computing device 150A such as a laptop or desktop (which is in turn connected via the Internet or other intermediary networks to the AIES) may be used to submit the input for the selected model. Within the AIES, one or more user input collectors 165 implemented at one or more computing devices may capture the input signals transmitted from the client device, convert/reformat them if needed before the sample GAI model is run. The output music generated by the sample GAI model 160 may be played back, e.g., via one or more output presentation managers 166 and a web browser running at the client device 150A in some embodiments. The client may experiment with other sets of input notes, listen to the different output music items produced in response, and thereby get an introductory high-level sense of what the selected sample GAI model does in the depicted embodiment.

Output presentation managers 166 may enable clients, if interested, to view and explore various types of input and other artifacts associated with the sample GAI models (and/or other models of interest to a client). For example, example data records of a corpus 161 (e.g., music recordings, drawings etc., depending on the problem domain for which GAI models are being used) which were used for training and/or evaluating models may be accessed via interfaces 177 in the depicted embodiment, and/or reference artifacts 162 such as commented code or hyper-parameters may be presented to clients if desired. In one embodiment, the AIES 110 may utilize one or more other services, such as an object storage service of a provider network or a database service of a provider network, to store the data records corpus 161. In at least some embodiments, one or more exploration/editing tools such as machine learning notebooks may be presented to clients. Notebook interfaces may, for example, automatically incorporate or load various machine learning, statistics and other types of libraries into an interactive development and experimentation environment (thereby reducing the amount of work that has to be done by clients to view or rearrange data sets, experiment with models or data analysis steps and so on), provide easy-to-use annotation capabilities which clients can use to record and share comments, suggestions, and the like. The AIES may include one or more tool managers 163 for managing the underlying resources used for such tools in the depicted embodiment.

In at least some embodiments, the AIES 110 may generate and store a set of tags or other similar metadata 171 which can be used to select similar content items from one or more corpuses 161. For example, with respect to music content items, a number of tags indicative of genres (e.g., "rock", "jazz", etc.) may be generated or obtained for respective content items of a corpus 161. With respect to visual artworks, tags such as "impressionist", "medieval", "cubist", "abstract expressionist" and the like may similarly be obtained or generated in some embodiments, and so on. In some embodiments, one or more sophisticated content classification models may be trained to generate such tags or metadata for each category of content for which a corpus is managed or stored at the AIES 110, e.g., using similarity analysis and other algorithms with respect to well-known examples of the different genres or styles. In addition to tags, metadata such as the number of instruments used for a given music content item, the types of instruments used, and so on may also be generated and provided to clients. One or more search engines 170 may be configured at or used by the AIES to enable clients to select data record examples of their choice for inclusion in training sets, e.g., for retrained versions of the sample GAI models and/or for training entirely new models being created on behalf of the clients.

In order to help illustrate the improvements achieved during the course of iterative training of one or more models to clients via programmatic interfaces 177, a sophisticated data transformation and visualization technique may be employed at the AIES 110 in some embodiments. For example, respective visual representations of output music content items (e.g., produced in respective training iterations for the same input content items) may be generated, structural similarity matrices may be generated using the visual representations, and/or reduced-dimension versions of the visual representations may be presented to clients. A number of metrics useful to compare content items may be produced by metrics generators 181 in the depicted embodiment, including for example structural similarity/dissimilarity metrics, beat or pace-related metrics, and so on, and presented to clients via interfaces 177. Such presentation material may, for example, clearly indicate/illustrate how the output is changing from one iteration to another, how fast it is converging on some set of desired attributes, and so on. In some embodiments, a multi-modal presentation of such differences may be provided—e.g., audio versions of the two output music items may be presented, compressed or reduced-dimension visual representations (as single points in a 2-dimensional or 3-dimensional space) of the music items may be presented, and/or a video representation showing the music properties as a function of time for each of the output music items may be displayed. For example, if each music item being compared or examined is 60 seconds long, respective videos or animations that are 60 seconds long may be generated and shown in some embodiments.

Clients may select training data sets and request the training of their own models (e.g., variants of the sample GAI models, or entirely new models coded by the clients) via programmatic interfaces 177 in the depicted embodiments. Models implementing a variety of GAI algorithms 131 of the AIES's algorithm library 130 may be used as sample models (or for client-requested custom models) in the depicted embodiment, including for example generative antagonistic network (GAN) algorithms 133, variational auto-encoders (VAE) algorithms 134, auto-regressive (AR) models 135 and the like. In some embodiments, the AIES may maintain a trained model repository 120 at which trained (or re-trained) versions of a client's customized models and/or the sample GAI models may be stored; in other embodiments, external repositories may be utilized. Models may be trained at client request using a set of model training resources 122 in the depicted embodiment. After an acceptable trained version of a model is generated and stored, in some embodiments a separate set of model execution resources 140 may be employed to run the model on new inputs (e.g., inputs which were not part of the training data set of the model). In at least one embodiment, a machine learning service of a provider network may be employed to train and/or run models on behalf of the AIES, and/or to store the trained models.

In some embodiments, in addition to or instead of using music-related GAI models for educating clients, an AIES may use GAI models for other types of content creation or synthesis. For example, in one embodiment, a client may use a tablet based drawing or painting interface 179 to submit visual content items (e.g., sketches of landscapes) via a client computing device 150B, and GAI models that generate new visual content items based on the supplied input may be used to illustrate the concepts of machine learning, using techniques analogous to those discussed above in the context of music.

Overview of Example Hands-On Learning Experience

Figure 2:
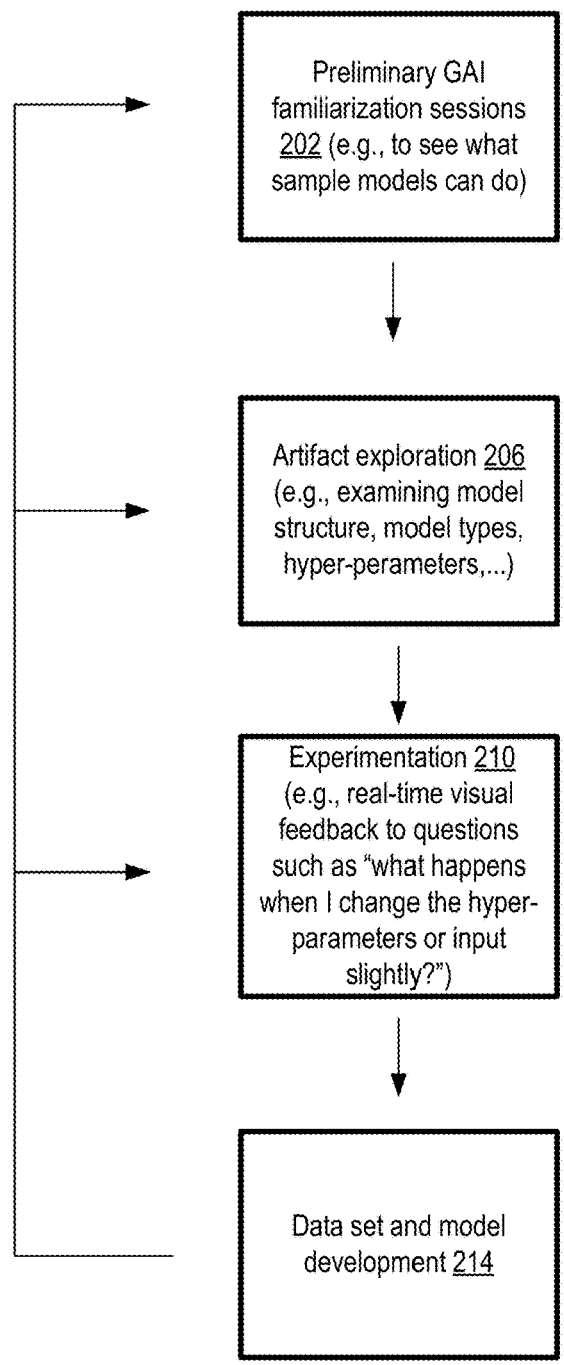
FIG. 2 illustrates a high-level overview of an iterative hands-on approach for learning about artificial intelligence that may be enabled at an artificial intelligence education service, according to at least some embodiments.

FIG. 2 illustrates a high-level overview of an iterative hands-on approach for learning about artificial intelligence that may be enabled at an artificial intelligence education service, according to at least some embodiments. To begin with, a client of an AIES similar in features and functionality to AIES 110 of FIG. 1 may participate in one or more preliminary familiarization sessions 202 in which the baseline concepts of generative AI are presented by the AIES. In such sessions, for example, an input music item created by a client (or selected from a menu of available simple tunes) may be provided as input to one or more sample, pre-trained GAI models, and the corresponding output generated by the GAI model may be presented to the client. This may indicate the types of operations a GAI model typically performs: it learns (during training) various salient characteristics of a collection of input records, and is then able to create or synthesize new output records based on (a) the learned aspects of the training data and (b) the characteristics of the input records fed into the models, with some level of randomization being introduced to prevent repeat creation of identical output even for the same input record.

In a second stage, after the client has participated in the simple input versus output experiments of the initial familiarization sessions, a client may perform artifact exploration 206 using AIES interfaces in some embodiments. In this phase of the process, the client may wish to take a look at such things as the type and structure of the model (e.g., are GANs or VAEs used, are neural networks used, how many neural network sub-models are used, etc.), significant hyper-parameters (e.g., how many neural network layers of various kinds are used, what factors are used to end training iterations, etc.) and their values and so on.

In an experimentation stage 210, a client may start trying out variations in various properties of the GAI system—e.g., to obtain answers to questions similar to "what happens if I change the hyper-parameters or input slightly?" In at least some embodiments, compelling visualizations, including videos, multimedia and/or still graphics, may be generated to illustrate answers to such types of questions. Structural similarity matrix-based visualizations of the kind discussed above may be employed in some embodiments to help provide more intuitive or easy-to-grasp explanations of differences (e.g., between the outputs generated using different inputs) in some embodiments.

Some clients may eventually gain enough conference during the first three stages of the approach shown in FIG. 2 to begin to try their hands at generating custom models. As part of hands-on data set and model development stage 214, such clients may, for example, decide to create custom training data sets by filtering a corpus of examples using tags or other metadata provided by the AIES, modify model code or hyper-parameters, and so on. Clients may go back and forth between the different stages shown in FIG. 2 if desired in various embodiments; e.g., a client may go through all one or more of the stages shown in FIG. 2 stages for GAN models, and then decide to repeat some of the stages for VAE models.

Example of Simple Building-Block Models for Music Generation

Figure 3:
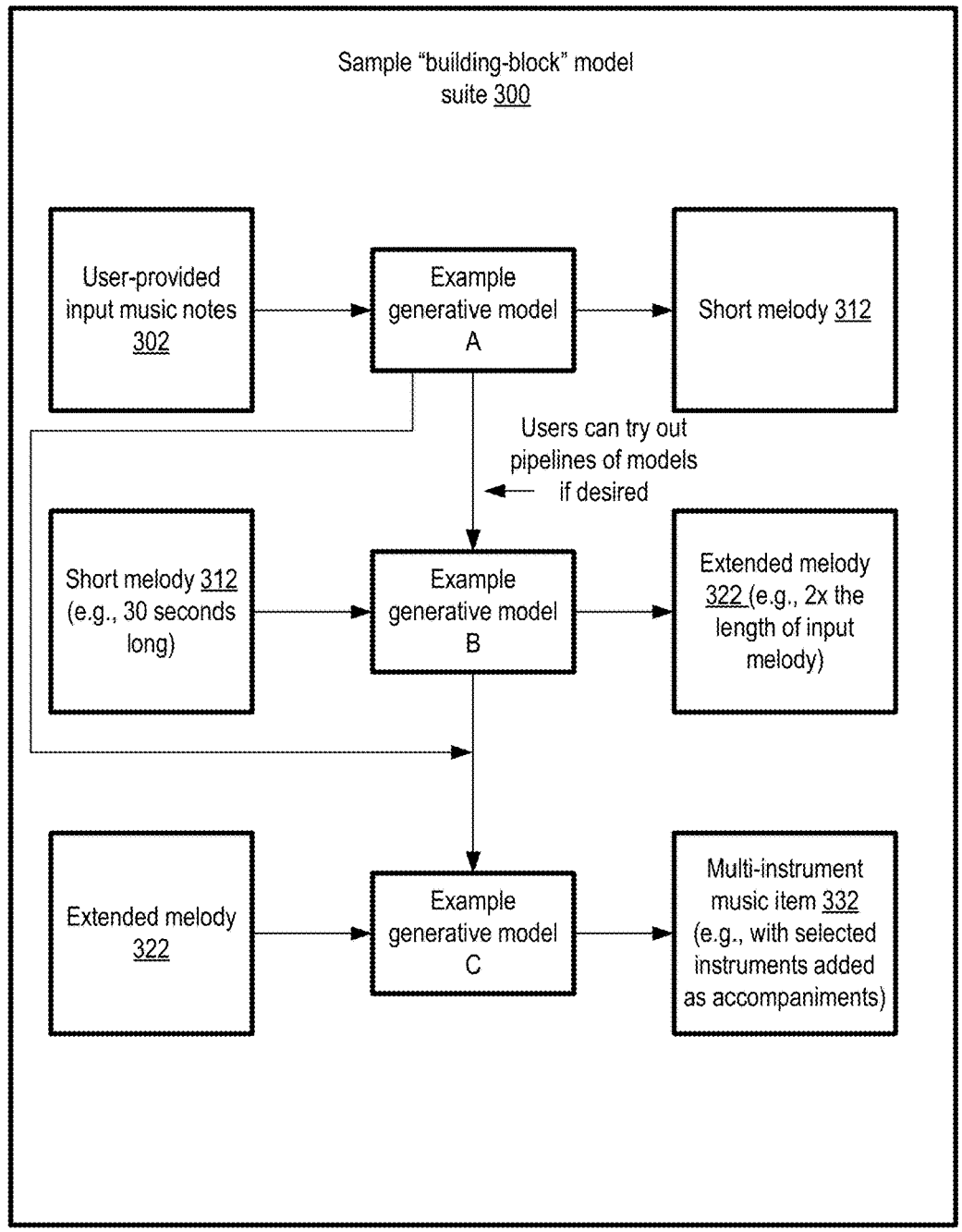
FIG. 3 illustrates an example of sample building block models which may be used to illustrate differing levels of complexity of content creation tasks which may be performed using machine learning algorithms, according to at least some embodiments.

FIG. 3 illustrates an example of sample building block models which may be used to illustrate differing levels of complexity of content creation tasks which may be performed using machine learning algorithms, according to at least some embodiments. In the depicted embodiment, a suite 300 of three GAI models for synthetic music creation, called models A, B and C respectively, may be presented via programmatic interfaces to an AIES client.

Example generative model A may consume sequences of a few musical notes 302 each as input, e.g., including randomly selected notes produced by a given instrument such as a keyboard of the kind discussed above, and create a short musical melody 312 (using the same instrument) based on the input notes. The overall duration of the output melody may be approximately equal to the overall duration of the input notes sequence.

Example generative model B may take such short melodies 312 as input, and generate respective extended melodies 322 as output (e.g., generating 60-second output items corresponding to 30-second input items), without adding any additional instrumentation or accompaniment in the depicted embodiment.

Example generative model C may take an extended melody 322 as input, and generate a multi-instrument music item 332 as output, adding some number of instruments as accompaniments in the depicted embodiment. The three building-block models may represent different levels of algorithm complexity in the depicted embodiment—for example, model C may be considered the most complex and model A the least complex. Clients of an AIES may examine details of the individual models to appreciate the underlying structural and/or algorithmic differences that enable such differences in complexity in various embodiments. In at least some embodiments, combinations of the building block models A, B and C may be executed as a pipeline, and the AIES may enable clients to construct and experiment with such pipelines instead of working with just one of the models at a time. Thus, in such an embodiment, an interactive graphical interface may be provided enabling a client to link and experiment with model A and model B as a pipeline, model A and model C as a pipeline, or the combination of models A, B and C as a pipeline. Synthetic output produced at each of the stages of a pipeline may be compared by the client using the AIES interfaces. The building-blocks pipelines may thus enable clients to gain an understanding and appreciation of the way in which different machine learning models are often combined in practice.

Example Generative Learning Algorithms

FIG. 4 illustrates example generative learning algorithms which may be employed at an artificial intelligence education service, according to at least some embodiments. As shown, algorithms and model types 400 may include, among others, generative adversarial networks (GANs) 412, variational auto-encoders 422, autoregressive models 432 and transformer models 442 in the depicted embodiment.

A GAN 412 may comprise two underlying neural networks in various embodiments, known as the generator (or composer) and the discriminator (or judge). The generator attempts to create examples of data that are realistic, while the discriminator attempts to distinguish between the generated examples and a set of real examples. The generator and the discriminator are trained together, with the generator in effect trying to convince the discriminator that the generator's output represents real examples, and the discriminator making judgements regarding the fidelity of the composed examples. The two networks attempt to each an equilibrium during training, such that data produced by the generator eventually reaches a threshold level of similarity with respect to the real data.

A VAE 422 may also include two underlying networks, an encoder and a decoder, each of which may also be implemented using neural networks in some embodiments. The encoder learns to construct a latent distribution representing characteristics of the input data records, which is then sampled and passed to the decoder to generate output data records which incorporate learned features of the input which were captured in the latent distribution. By identifying specific properties of the intermediary latent distributions which correspond to specific output characteristics (such as, in the case of portrait photographs, the presence of a feature such as a smile on the face of an individual represented in the portrait), and sampling or modifying the latent distribution appropriately, the output generated by the decoder may be modulated or controlled in at least some embodiments. For example, by adjusting aspects of the latent distribution or its sample, an output group photograph with more smiling faces than the input may be generated. Similarly, for music items, properties such as "jazziness" may be increased using analogous adjustments in some embodiments.

Autoregressive models 432 may have a simple and stable training process and may produce good results with the help of efficient sampling of the input data. Autoregressive models may implicitly define a distribution over sequences using the equivalent of the chain rule for conditional probability, whereby in each step the distribution of the next sequence element is predicted given the previous elements. Autoregressive models 432 may be considered representations of random processes which correspond to time-varying processes in the real world.

Transformer models 442 may combine convolutional neural networks with attention mechanisms (e.g., self-attention models) to generate content items in various embodiments (e.g. to generate output text from input text). The attention mechanisms, as suggested by the name, enable the model to focus on the more relevant parts of the input records. In some implementations, a transformer may include multiple encoders and decoders, with each encoder and each decoder in turn comprising one or more attention layers and a feed forward neural network.

Other types of generative algorithms and models than those shown in FIG. 4 may be employed in some embodiments at an AIES. In at least some embodiments, less complex neural network-based models than those shown in FIG. 4, e.g., models utilizing various types of recurrent neural networks, LSTM (Long Short Term Memory) units and the like may also be employed for generating some types of content (e.g., text). At least one model that does not utilize neural networks may be used in one embodiment.

Example Interface to Explore Details of a Model

Figure 5:
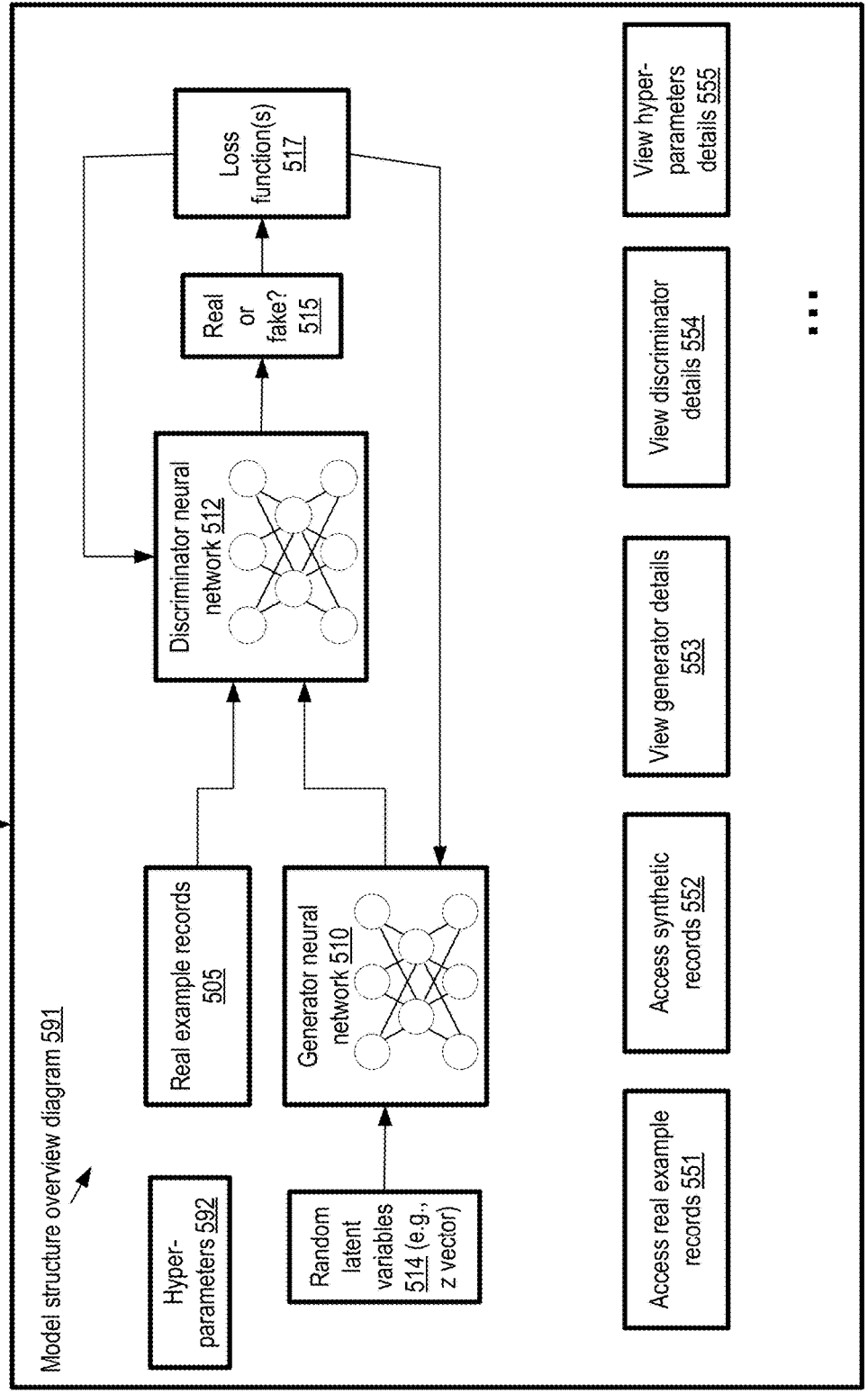
FIG. 5 illustrates an example interactive interface which may be used to explore details of a generative model, according to at least some embodiments.

FIG. 5 illustrates an example interactive interface which may be used to explore details of a generative model, according to at least some embodiments. In the depicted embodiment, a representation of a generative adversarial network (GAN) model (which may be one of the sample GAI models of the AIES, or a custom model created on behalf of a client of the AIES) is presented to a client via exploration interface 500. Similar interfaces may be implemented to allow AIES clients to explore other types of GAI models in different embodiments, including VAEs, autoregressive models and/or transformer models.

The interface 500 may include a model structure overview diagram 591 as well as several interface elements which can be used to view and/or modify additional details regarding various aspects of the model and the data being used. The model comprises a generator neural network 510 and a discriminator neural network 512. Inputs to the generator neural network 510 include random latent variables 514 (sometimes referred to as a "z vector") and feedback based on loss functions 517 computed on the output of the discriminator neural network 512. Input of the discriminator neural network 512 comprises samples of the output of the generator 510 as well as real example records 505. The discriminator 512 attempts to distinguish between the real example records and those produced by the generator, as indicated in the "real or fake?" element 515.

A client of the AIES may drill down into various aspects of the model in the depicted embodiment via respective elements of the interface 500. For example, interface element 551 may be used to access (e.g., view or hear, depending on the nature of the data) one or more real example records 505, while interface element 552 may be used to access one or more synthetic records produced by the generator. The view generator details interface element 553 may allow a client to inspect the internal structure (e.g., the number and types of neural network layers) of the generator 510, and the view discriminator details interface element 554 may enable the exploration of the internal structure of the discriminator (as well as loss function(s) 517). The view hyper-parameters details interface element 555 may enable the client to view values of (and explanatory comments regarding) various hyper-parameters 592 of the model in the depicted embodiment. In at least some embodiments, clients may be able to obtain details regarding various parts of the model (e.g., the discriminator or the generator) simply by clicking on the images or icons representing the parts. In at least one embodiment, in addition to allowing clients to view details, the interface 500 (or other interfaces invoked from interface 500) may enable clients to change or edit various aspects of the model: for example, slider interface elements or knob interface elements for modifying hyper-parameter values may be provided as part of a response to a request for hyper-parameter details. Clients may, for example, modify the number of artificial neurons in various layers of the model, and/or the number and types of the layers themselves. Clients may be able to create and save a new version of the model, if desired, which includes the modifications.

Example Tag-Based Interface for Data Set Selection

Figure 6:
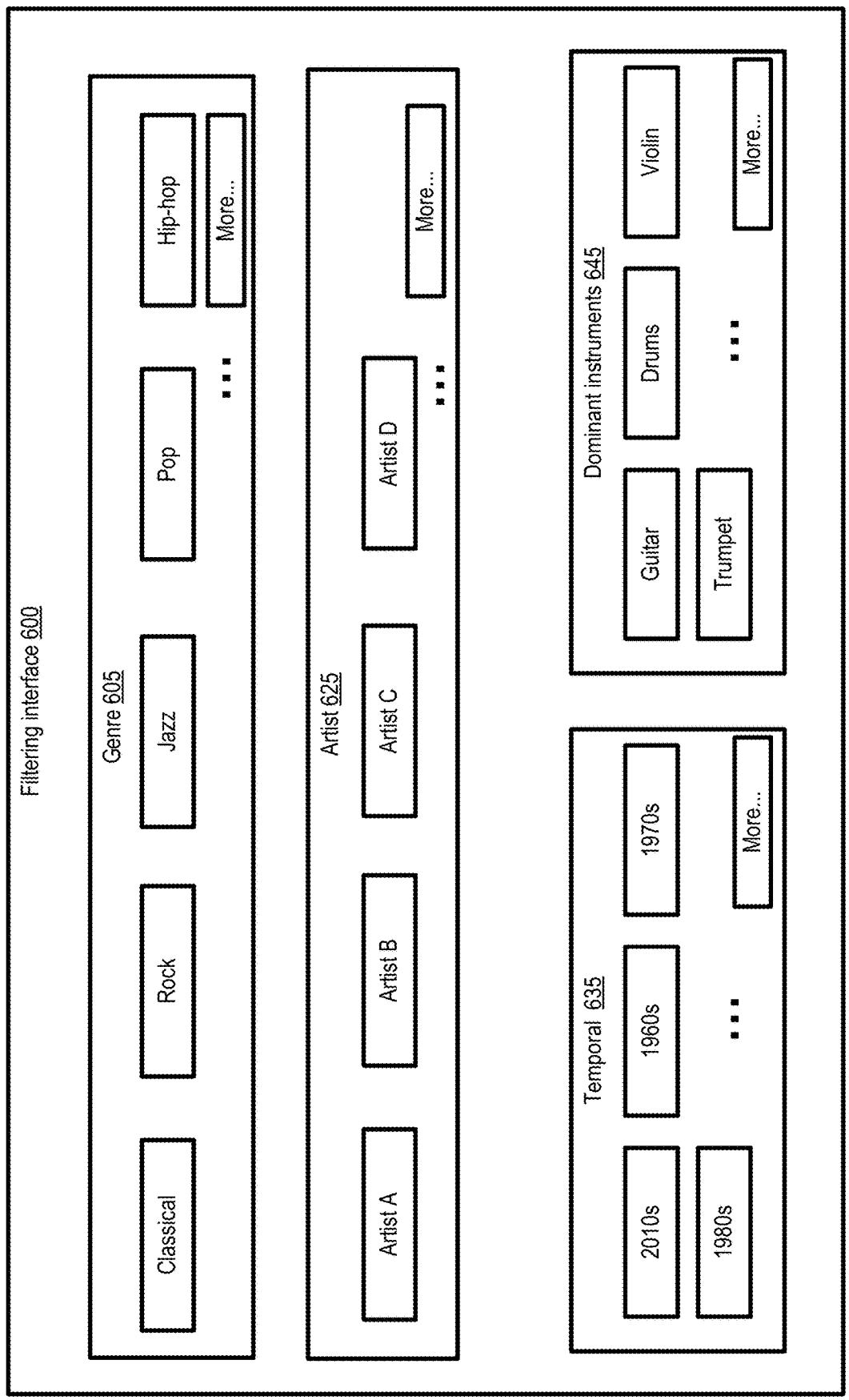
FIG. 6 illustrates an example of a tag-based interface which may be utilized to curate training data used for a generative model, according to at least some embodiments.

FIG. 6 illustrates an example of a tag-based interface which may be utilized to curate training data used for a generative model, according to at least some embodiments. In at least some embodiments, a client of an AIES similar in features and functionality to AIES 110 of FIG. 1 may wish to train a new generative model to produce content items which have a selected combination of properties (e.g., music items in which drums dominate, but violins are also present) which differ from the properties of the output of the sample models of the AEIAS. In order to obtain such customized output characteristics, a training data set which comprises examples with similar characteristics may have to be obtained. In the depicted embodiment, the AIES may present a tag-based filtering interface 600 to enable the client to obtain a customized training data set. The example tags shown are for music items; other combinations of tags may be obtained, generated and presented analogously for other types of content such as paintings, drawings and the like in different embodiments.

Generally speaking, the ability to curate datasets that accurately represent the type of data or content to be generated is an essential aspect of using generative models. In various embodiments, an AIES may collect metadata that can be used to characterize example items of one or more corpuses (e.g., a music corpus, a painting corpus, a text corpus etc.) from a variety of sources including public databases accessible via the Internet, and generate tags based on the collected metadata. Indexes on the collected metadata may be created and utilized for an efficient search engine of the AIES in the depicted embodiments, e.g., with the search engine and indexes utilizing one or more services of a provider network (such as a search service, a storage service, various computing services and the like). In some embodiments, the data items of the various corpuses may be analyzed using other machine learning models to generate at least some of the metadata. With respect to musical data, structural information obtained about the music items may include such properties as tempo, number of instruments, types of instruments, and the like, which may also be mapped to tags selectable via an interface similar to interface 600.

Tags for a number of different 605 genres of music may be selectable by a client in the depicted embodiment, including for example "Classical", "Rock, "Jazz", "Pop", "Hip-Hop" and the like. Tags for popular artists 625 or musical groups may be displayed and selected via interface 600, such as Artists A, B, C and D. Clients may request that examples of music with dominant instruments 645, such as guitar, drums, violin, trumpet and the like be selected from the available corpus for inclusion in a training data set in at least some embodiments. In some embodiments, temporal tags 635, corresponding for example to respective decades in which the music items were produced (such as 2010$s$, 1960$s$ etc.) may be presented as options for selecting examples for the training data. Clients may select multiple tags for the filtering to be performed on their behalf in at least some embodiments. In the depicted embodiment, only a few example tags for a given tag category (e.g., genre, artist, etc.) are shown; if the client does not find the particular tags of most interest, interface elements such as the "More . . . " buttons shown in FIG. 6 may be employed to view additional tags of various categories. In some embodiments, a pool of annotators may be utilized to generate at least some of the tags which can be used to filter data sets. In one embodiment, a network-accessible service of a provider network may provide programmatic interfaces which can be used by individuals to register as annotators, and the AEIAS may use such a service to help generate tags for its corpuses of music and other types of content. As mentioned earlier, in some embodiments a preference deduction approach (in which a client provides feedback regarding likes/dislikes for specific examples of music or other contents, instead of or in addition to selecting tags, thereby enabling the AIES to deduce the kinds of music the client wishes to include) may be used to select training data.

Example Hands-on Teaching Features

FIG. 7 lists examples of hands-on teaching features which may be implemented at an artificial intelligence education service, according to at least some embodiments. Generative models that produce music items as output, derived at least in part from client-provided input music items, may be used to help teach AIES clients about machine learning in the depicted embodiment. One of the key hands-on aspects or features 700 of the AIES is the real-time audio playback of generated music examples 702. This provides immediate feedback to the clients regarding the creative transformations of the models being used, which may help retain the interest of AIES clients.

Clients may be afforded the opportunity to dynamically switch between model types 704 via the interactive interfaces of the AIES in some embodiments. For example, a client may generate an input set of notes, hear the corresponding output generated by a GAN model, and then use a single click on a web page to hear the corresponding output (for the same input) generated by a VAE model or a transformer model. Perceived differences between the outputs produced by the different model types may entice the client to further investigate the details of the model types. Clients may similarly be provided easy-to-use interfaces able to dynamically switch between models (such as the building block models discussed earlier) of different level of complexity, and/or combine various models in a pipeline or workflow in various embodiments.

If and when a client wishes to explore the influence of various hyper-parameter values on the behavior or output of a model, graphical selection of combinations 706 of different values may be enabled by the AIES in at least one embodiment. For example, graphical user interface elements such as sliders, knobs and the like, displayed for several different hyper-parameters on the same web page or layout, may be used to change hyper-parameter values singly, or to try out new combinations.

In at least some types of GAI models, the output may be based not only on the input and the model parameters learned during training, but also on a randomization factor (or factors), sometimes referred to as a "z vector". Such randomization may lead to the desirable feature that even if the same input record is supplied repeatedly to the model, the outputs produced for the different repetitions is not identical. In some embodiments, clients may be allowed to experiment with such randomization inputs 708 via graphical user interface elements, e.g., to increase or decrease the extent of random variation introduced into the model outputs.

Graphical interfaces for viewing model components/structures 710 may be provided by the AIES, similar for example to the interface discussed in the context of FIG. 5 for a GAN model. Generally speaking, such interfaces may enable clients to obtain any of multiple levels of detail regarding various aspects of the models, without having to open editing tools or the like.

In at least some embodiments, visual representations of a number of metrics computed primarily or specifically to help educate clients may be presented by an AIES. Such metrics may, for example, include similarity/difference metrics 712 between various content items, such as the content items generated in different training iterations of the model for a given input. In the case of music items, a multi-step transformation operation may be performed to generate such visual similarity metrics, as discussed in further detail below in the context of FIG. 8. Such visual representations may help make it easier for clients to appreciate the improvements achieved over multiple training iterations, and thus help illustrate the benefits of iterative training.

Fully-commented and easy to read versions of artifacts such as source code, hyper-parameter files, tutorials and the like may be presented as part of the hands-on education for clients in various embodiments, as indicated in element 714. In addition, in at least some embodiments, simplified machine learning notebook interfaces 716 may be presented to clients for exploring/annotating models and data. Some of the overhead associated with setting up such notebooks, such as acquiring compute resources and/or software containers, may be eliminated to reduce the burden on the clients (such tasks may be performed transparently, behind the scenes, by the AIES). Other hands-on teaching features and techniques may be employed at an AIES in some embodiments, different from those shown in FIG. 7.

Example Visual Representations of Iterative Training Improvements

Figure 8:
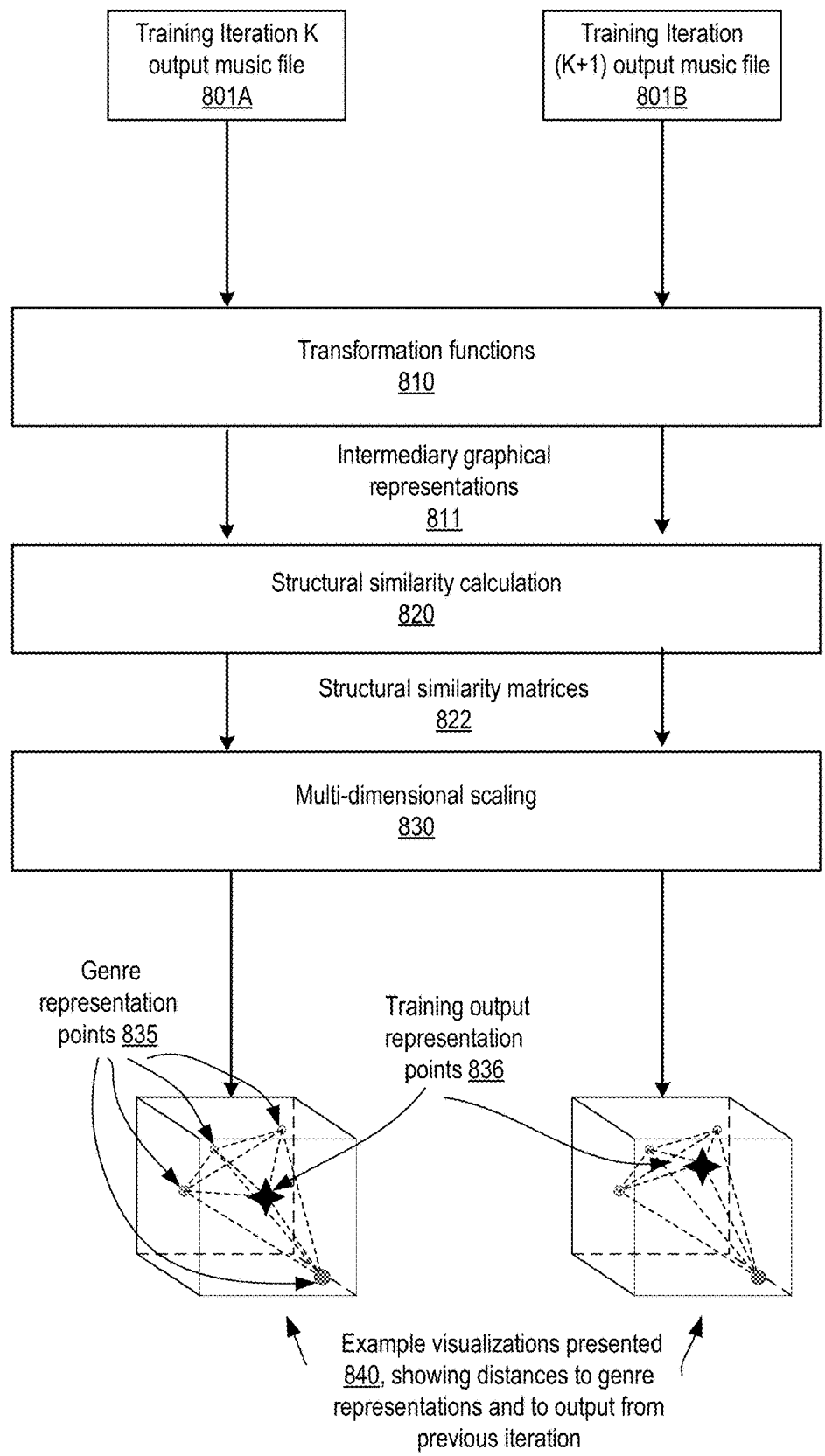
FIG. 8 illustrates an example technique which may be used to show iteration-to-iteration changes during the training of a generative model for creating music examples, according to at least some embodiments.

FIG. 8 illustrates an example technique which may be used to show iteration-to-iteration changes during the training of a generative model for creating music examples, according to at least some embodiments. Respective output music files 801A and 801B may be produced (e.g., for the same input file) in iterations K and (K+1) of the training of a GAI model in the depicted embodiment. Generally speaking, the patterns of music in the files 801 may be similar if the music belongs to the same genre. One or more transformation functions 810 may be applied to generate intermediary graphical representations 811 of the respective files, e.g., in a format similar to a piano roll. A piano roll is a music storage format in which, for example, perforations are generated on a sheet or roll of paper to indicate note control data. The roll can be moved over a reading system known as a 'tracker bar' and the playing cycle for each recorded musical note may be triggered (e.g., at a playback piano or reproducing piano) when a perforation crosses the bar and is read. Note that at least in some embodiments in which piano-roll like representations of the music are generated, they may be created digitally, without using physical paper. Other types of intermediary graphical representations may be generated in different embodiments, which may not necessarily be based on piano rolls.

A respective structural similarity calculation 820 may then be applied to the respective intermediary graphical representations 811 to generate similarity information (e.g., such as similarity matrices 822) for the pair of music files 801 in the depicted embodiment. Any of a number of structural similarity determination algorithms may be used in different embodiments; in some embodiments, a perception-based model that considers image degradation as perceived change in structural information, while also incorporating important perceptual phenomena, including both luminance masking and contrast masking terms may be employed. A visualization technique for similarity data (e.g., multi-dimensional scaling 830) may be applied to the similarity matrices 822 to generate respective visualizations 840 indicating similarities/differences among the music files 801. In multi-dimensional scaling, an input matrix indicating dissimilarities between pairs of items is analyzed, and a coordinate matrix is produced as output, in which a loss function referred to as strain may be minimized. Combinations of other techniques may be employed in some embodiments.

In the depicted example scenario, points 836 may represent the individual music files 801, shown in relation to genre representation points 835. One of the points 835 may, for example, represent "1970s jazz from the USA", while another may represent "1960's Brazilian jazz". The relative proximity or distance of the output representation point 836 from these genre points may indicate how close the output is to replicating or emulating key characteristics of the genres. The movement or repositioning of the training output representation points 836 from iteration K to iteration (K+1) may indicate the different levels of learning achieved in the respective iterations, for example. In some embodiments, the AEIAS may indicate the repositioning even more concretely, e.g., by showing an animation illustrating the movement of the training output representation. In one embodiment, visual representations of the structural similarity matrices 822 (e.g., in the form of heat maps) may also or instead be presented to clients of the AIES. Other types of visualizations indicating similarities or differences between content items may be generated in other embodiments. The kinds of visualizations shown on FIG. 8 may be utilized at an AIES in some embodiments not just for indicating differences between outputs of different training iterations, but also to compare input content items, or output items generated after the training is concluded. In addition to visualizations such as those shown in FIG. 8, in at least some embodiments audio playbacks which emphasize the differences between respective music items may be provided—e.g., the AIES may, if desired, play back the sub-passages that are the most different between the music items being compared. The AIES may detect such "more different" passages using a number of different metrics computed for the music items, such as the instrument combination, the pitch, the tempo, etc. of 5-second long passages.

Example Programmatic Interactions

Figure 9:
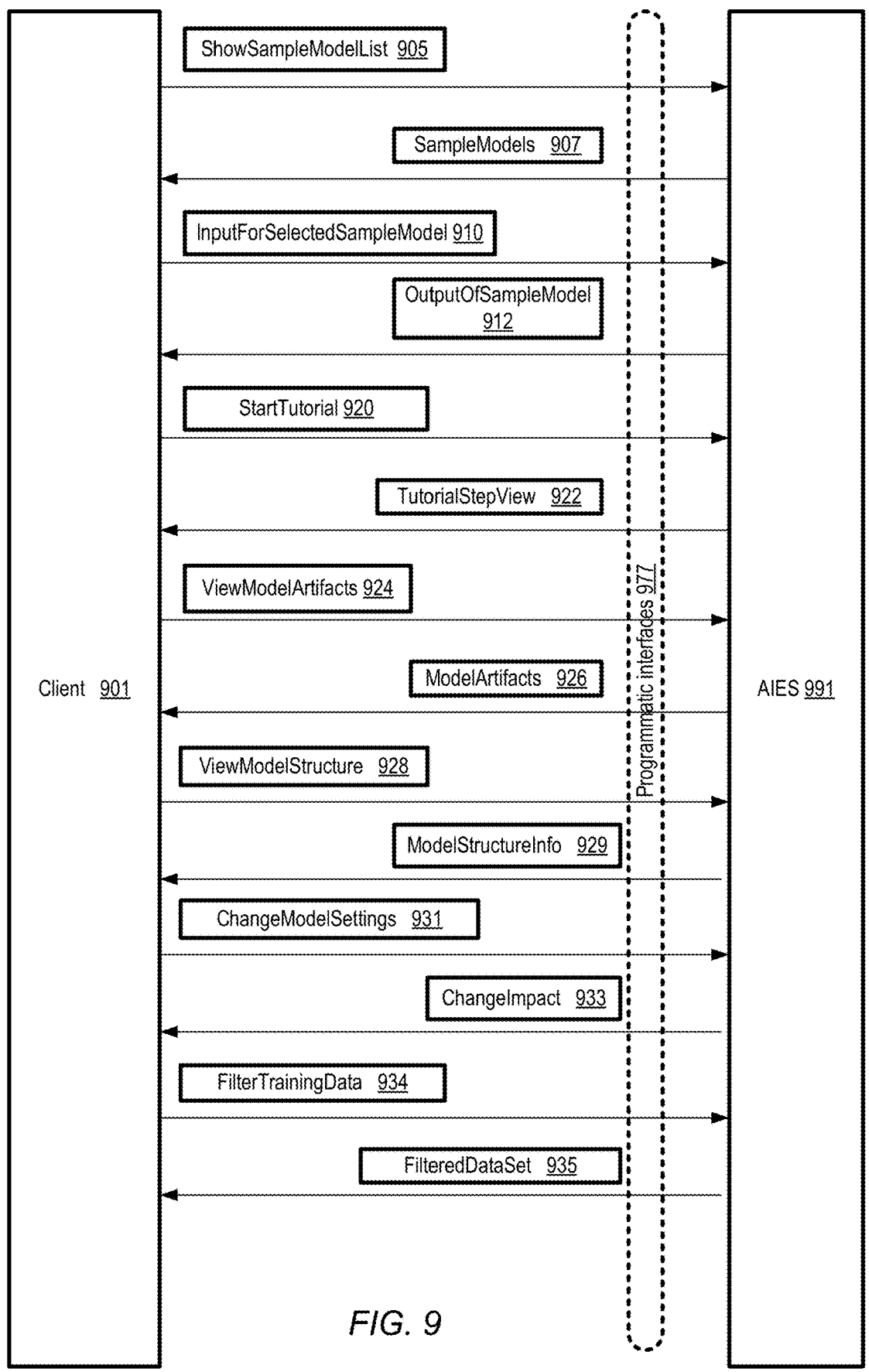
FIG. 9 and FIG. 10 collectively illustrate examples of programmatic interactions with an artificial intelligence education service, according to at least some embodiments.
Figure 10:
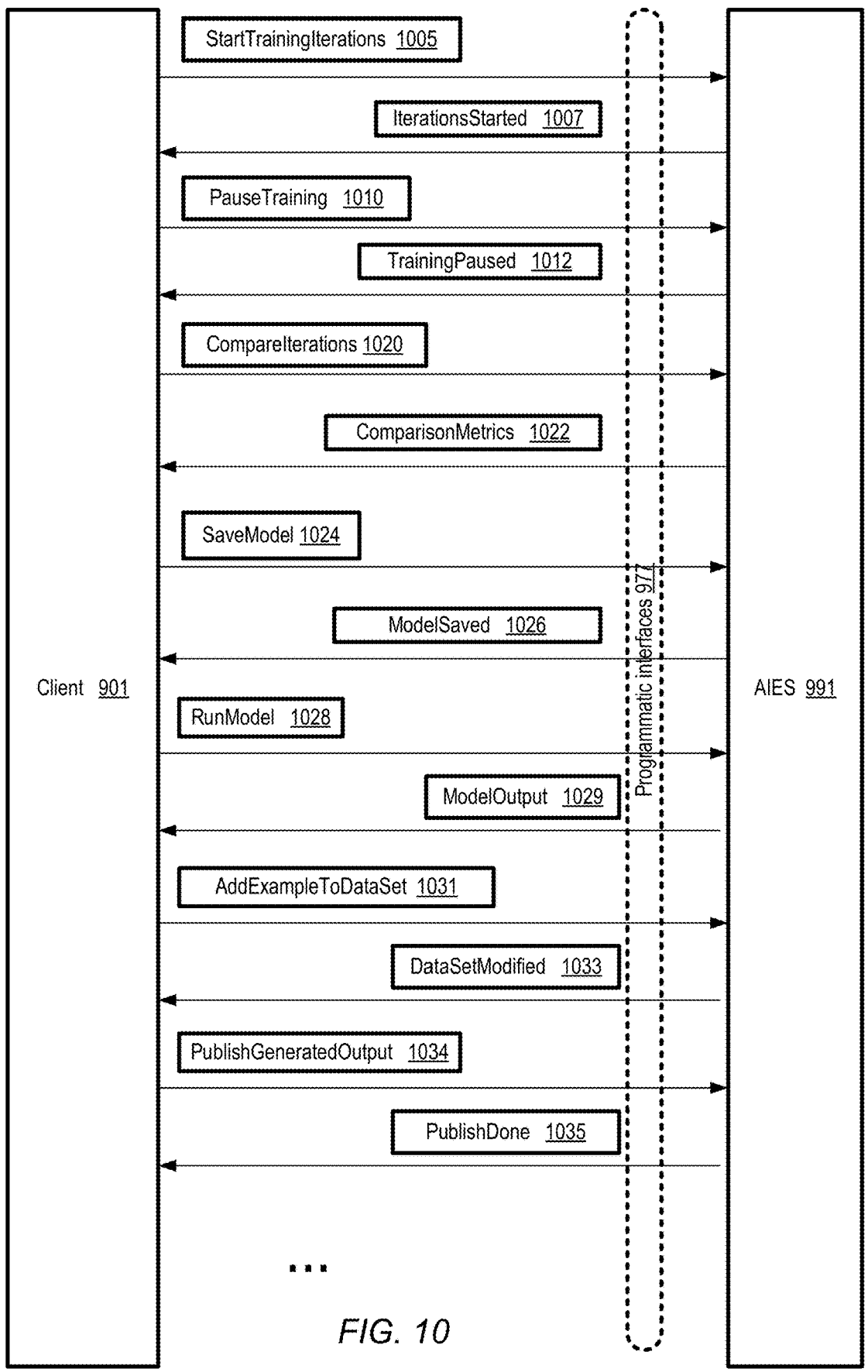

FIG. 9 and FIG. 10 collectively illustrate examples of programmatic interactions with an artificial intelligence education service, according to at least some embodiments. In the embodiments depicted in FIG. 9 and FIG. 10, an AIES 991, similar in features and functionality to AIES 110 of FIG. 1, may implement one or more programmatic interfaces 977, such as graphical user interfaces, web-based consoles and the like, which may be used by clients to submit requests and receive corresponding responses. Such interfaces may include elements (such as clickable links, buttons, sliders and the like) which may in turn cause lower-level programmatic interfaces such as APIs or command-line tools to be invoked. Generally speaking, individual ones of the interactions illustrated in FIG. 9 and FIG. 10 may be implemented using either the higher-level graphical or web-based interfaces, or the lower-level APIs/commands in different embodiments. In some cases, simply accessing a web-based console or portal may cause several lower-level APIs to be invoked.

A ShowSampleModelList request 905 may be submitted to AIES 991 by a client 901 via programmatic interfaces 977 in the depicted embodiment to determine the kinds of models available for familiarization with various AI techniques. In response, a set of sample models may be indicated, e.g., via one or more SampleModels messages 907. In some embodiments, the client 901 may then select one of the sample models for further interactions, and submit client-created input for the model via an InputForSelectedSampleModel message 910. The input provided by the client may be fed to the selected sample model, and the output produced may be presented (e.g., via audio playback in the case of musical items) in one or more OutputOfSampleModel messages 912.

In some embodiments, the AIES 991 may provide access to one or more well-documented easy-to-run tutorials regarding the sample models and/or other aspects of artificial intelligence, and a client 901 may submit a programmatic request 920 to start a selected tutorial. A separate interface for the tutorial may be generated in response at the AIES 991, and presented in the form of one or more Tutorial Step View responses 922.

If and when a client wishes to view details regarding one or more models, a ViewModelArtifacts request 924 and/or a ViewModelStructure request 928 may be submitted in various embodiments. In response, the AIES may provide information about (or links to) artifacts such as source code, hyper-parameter names and settings, etc., in one or more ModelArtifacts messages 926 and/or provide details about model structure in one or more ModelStructureInfo messages 929.

In at least some embodiments, a client may wish to change one or more settings of a model (e.g., a particular hyper-parameter value), and observe the resulting changes in output produced by the model. A ChangeModelSettings message 931 may be submitted indicating desired modifications to the settings, and the AIES 991 may provide feedback regarding the impact of the changes in one or more ChangeImpact messages 933. Note that depending on the setting which was changed, the complexity of the model and/or the stage (e.g., training versus post-training) of the development of the model, it may take some time for the AIES to determine/detect the impact of the changes, so the ChangeImpact messages 933 may not necessarily be provided immediately. Other impact changes may be determinable in real-time in at least one embodiment, so the corresponding ChangeImpact responses may be near-instantaneous.

A request to create a filtered or curated training data set from a larger corpus of examples may be submitted via a FilterTrainingData request 934 in some embodiments, Such a request may, for example, indicate some client-selected combination of AIES-provided tags of the kind discussed earlier, the number of desired example records, and so on. The AIES may utilize a search engine to quickly generate the requested training data set, and provide an indication of the results of the search via one or more FilteredDataSet responses 935 in some embodiments.

Training of a model implementing a client-selected machine learning algorithm may be initiated in response to a StartTrainingIterations request 1005 (shown in FIG. 10) in some embodiments at the AIES 991. An IterationsStarted message 1007 may be sent to the client, and in some embodiments a dynamically updated view of the training iterations may be presented (e.g., the iteration count may be displayed, visualizations of the output produced for a given input record may be presented for each iteration, and so on. Clients 901 may pause the training iterations, e.g., to examine details of the progress achieved thus far, by submitting PauseTraining requests 1010 in the depicted embodiment. A TrainingPaused response 1012 may be sent to the client after the training operations are paused.

Clients may obtain one or more metrics pertaining to a selected pair of training iterations (which may not necessarily be consecutive iterations) by submitting a CompareIterations request 1020 in the depicted embodiment. Any of a number of metrics may be provided in response, e.g., in the form of one or more ComparisonMetrics messages 1022 in the depicted embodiment. In some embodiments, both objective and subjective metrics may be provided, e.g., using visualizations similar to those discussed earlier. Objective metrics may rely on facts or known properties which can be easily quantified. For example, in music, such metrics may include to drum patterns, percentages of various pitches in a music item, percentages of empty notes etc. These can be objectively measured and by showing that the more recently generated data is getting closer to the desired type of data in terms of these objective metrics, it may be shown that the model is working as desired in various embodiments. In image processing related domains, properties like gradient histograms, image intensity, number of prominent corners in the image and the like may be used as objective metrics useful for comparing pairs of data items. Subjective metrics such as the "jazziness of music" or "beautiful sceneries in an image" may be harder to quantify, although such properties are relatively easily understood by humans. By using techniques such as the kinds of tag-based filtering discussed above, datasets that closely represent such subjective qualities may be obtained by AIES clients and used to train models. Then, by measuring the similarity of the generated data against such datasets, e.g., using the structural similarity and multi-dimensional scaling techniques discussed in the context of FIG. 8, subjective metrics may also be produced and used for indicating comparisons between iterations (or between data items in general).

A client 901 may submit requests to save one or more models (e.g., models being trained on the client's behalf) via SaveModel requests 1024 in the depicted embodiment. The model and its associated artifacts (hyper-parameter files, training data set, etc.) may be saved at persistent storage devices of a repository in the depicted embodiment, and a Model Saved response message 1026 may be sent to the client. In some embodiments, the model and its artifacts may be stored in the form of a software container managed by a container service of a provider network, which can then be easily used to run the model at any of various computing devices. Clients may issue requests to run saved models using RunModel requests 1028, and receive the output generated by the models for various input records via ModelOutput messages 1029.

In some embodiments, an AIES client 901 may submit new examples of content items to be included in a corpus or training data set via one or more AddExampleToDataSet requests 1031. The supplied items may be added to the targeted data set and a DatSetModified message 1033 may be sent as an acknowledgement in at least some embodiments.

According to some embodiments, a client 901 may wish to publish content items generated using a model customized by the client, e.g., to one or more music streaming web sites, video streaming web sites or the like. A PublishGeneratedOutput request 1034 may be sent, indicating the generated content and the targeted destinations to which the content should be published. The AIES may facilitate the publishing and return a PublishDone message 1035 in some embodiments. In one embodiment, the AIES may provide a competition interface which can be used by clients to submit generated content items (e.g., along with some information about the models used), and the items generated by the participants in the competition may be rated or ranked by other users. Other types of programmatic interactions, not shown in FIG. 9 or FIG. 10, may be supported by an AIES 991 in various embodiments.

Example Provider Network

Figure 11:
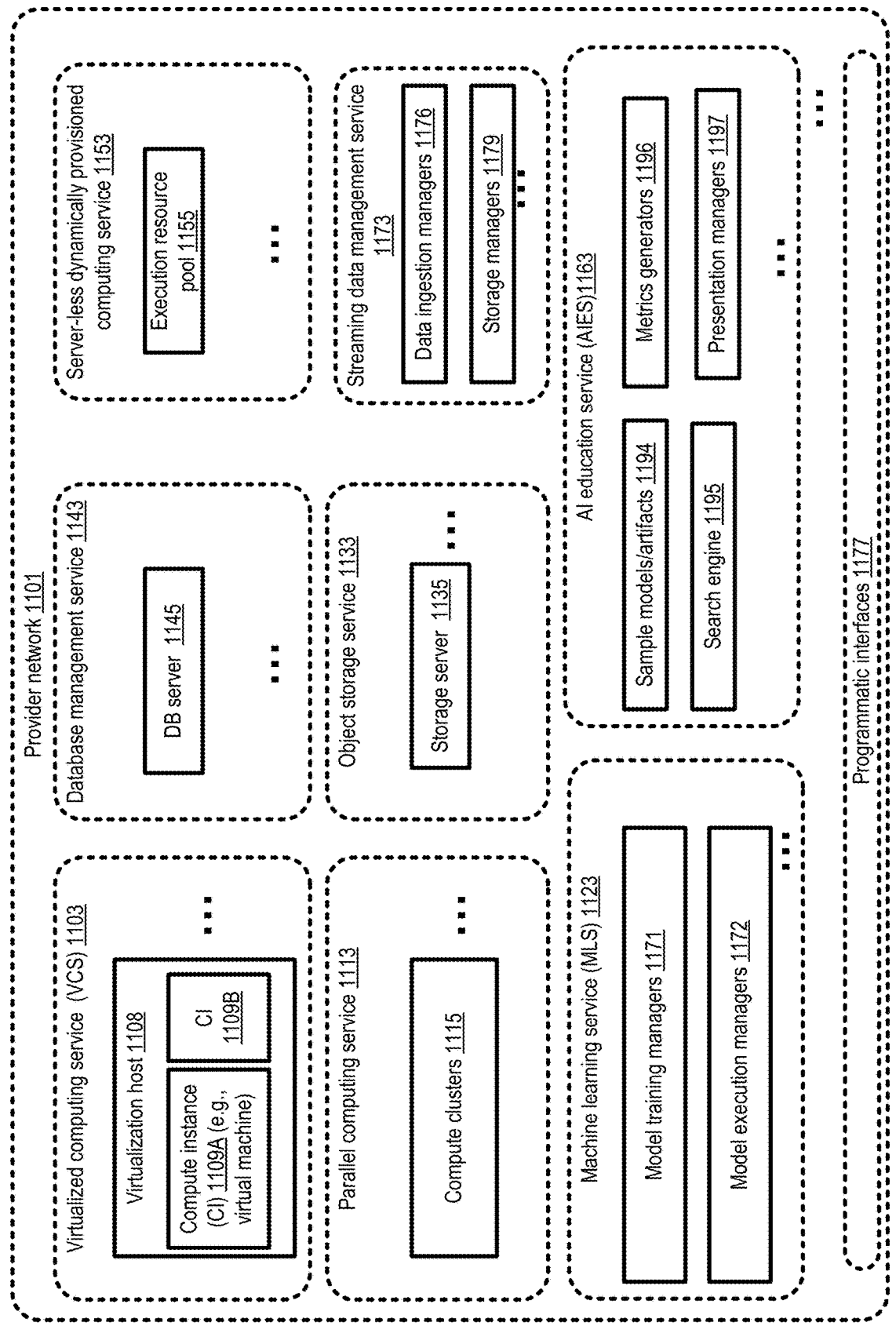
FIG. 11 illustrates an example provider network at which an artificial intelligence education service may be implemented, according to at least some embodiments.

As mentioned earlier, in at least some embodiments, an AIES similar to AIES 110 of FIG. 1 may be implemented as part of a suite of services of a provider network or cloud computing environment. FIG. 11 illustrates an example provider network at which an artificial intelligence education service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries. For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

In the embodiment depicted in FIG. 11, provider network 1101 includes a virtualized computing service 1103, a database management service 1143, a server-less dynamically provisioned computing service 1153, a parallel computing service 1113, an object storage service 1133, a streaming data management service 1173 that includes one or more data ingestion managers 1176 and one or more store managers 1179, as well as a machine learning service 1123 and an AIES 1163. AIES 1163, which may include numerous computing and/or storage devices implementing sample models/artifacts 1194, metrics generators 1196, search engine 1195, data presentation managers 1197 as well as other components similar to those shown in AIES 110 of FIG. 1, may utilize the machine learning service 1123 extensively in the depicted embodiment. For example, the training or re-training of GAI models used as sample models, the execution of trained versions of the models, and so on, may be conducted using MLS 1123 resources including model training managers 1171 and model execution managers 1172.

Each of the services of provider network 1101 may include a respective set of computing devices and/or other resources in some embodiments. Components of a given service may utilize components of other services in the depicted embodiment—e.g., compute instances (CIs) 1109A or 1109B (such as guest virtual machines) set up at the virtualization hosts 1108 of the virtualized computing service 1103 and/or storage servers 1135 of an object storage service 1133 may be employed by various other services of provider network 1101 to implement their respective functions. Individual ones of the services shown in FIG. 11 may implement a respective set of programmatic interfaces 1177 which can be used by external and/or internal clients (where the internal clients may comprise components of other services) in the depicted embodiment. Individual ones of the services shown in FIG. 11 may each provide high levels of automated scalability, availability, data durability, and failure resilience, enabling varying levels of workloads to be handled gracefully.

AIES 1163 may interact with or utilize other services of the provider network 1101 in one or more ways in some embodiments. At least some components of the AIES may utilize components of other services in one embodiment—e.g., search engine 1195 may comprise one or more compute instances 1109 or compute clusters 1115 of parallel computing service 1113, corpuses of content items, search indices and other data may be stored at database servers 1145 or storage servers 1135, machine learning notebooks and visualization data sets may be prepared using resources of server-less dynamically provisioned execution resources pool 1155, and so on. In at least one embodiment, at least some of the techniques discussed above for accelerating/facilitating AI education using hands-on approaches may be implemented without acquiring resources of network-accessible services such as those shown in FIG. 11. For example, a standalone set of computing devices which are not part of a network-accessible service may be used in some embodiments.

Example Problem Domains

FIG. 12 illustrates example domains for which respective generative models may be utilized at an artificial intelligence education service, according to at least some embodiments. Music composition 1204 has been discussed extensively as one example domain herein. GAI models that generate new or synthetic music items corresponding to input music passages or notes, based on the characteristics of the training data set used and/or randomized input, may represent a compelling set of tools which can be used to facilitate and accelerate AI education.

In some embodiments, graphic arts composition 1208 (e.g., drawings or paintings) may be used as the medium for explaining various aspects of artificial intelligence to some clients. GAI models may be trained to produce synthetic drawings or paintings in a manner analogous to that used for music items in such embodiments. In one embodiment, GAI models that create writing 1212 (e.g., stories, poems or the like) may be employed to help clients learn about artificial intelligence. In a related domain, GAI techniques may also be used to speed up engineering/design tasks such as converting rough drawings or sketched to professional level engineering drawings, which may be beneficial in a variety of applications such as automotive design, architecture and so on. In some embodiments, such engineering/design tasks may be used to help educate clients of an AIES.

GAI techniques introduced via sample models may also or instead be used for generating examples for medicine-related machine learning models 1216 in at least some embodiments. In order to train models which can be used for early detection of diseases, or to predict occurrences of disease, high quality training data may be required. The input data for such models may comprise such artifacts as medical test results (which may be text-based, graphical, video, or multi-modal), doctor's annotations, demographic details, and the like. Especially in the case of relatively rare diseases, the number of actual real-world examples available may be really low. Using GAI models, additional examples may be created, in which various properties of the real-world cases may be modified slightly. Such synthetic records may then be used to enhance the training data sets for the models, e.g., after the synthetic records are approved by medical professionals. In some embodiments, special domain-specific versions of the AIES may be developed—e.g., a version created specifically for medical professionals may be used to enhance disease-related training data.

Video games and/or animations 1220 may represent another domain which may be employed for AI-related education in some embodiments. Variations of the scenes displayed in animations or games may be generated using sample models and the like, and clients interested in video games may thereby be attracted to explore the underlying artificial intelligence techniques. Video games, animations and the like, as well as medicine-related tasks and engineering/design tasks, represent real-world use cases for GAI, and training individuals on AI techniques which can be used in such domains may result in a larger pool of skilled workers who can contribute in such fields.

In some embodiments, the AIES may provide a programmatic interface which enables a client to select the particular content type or domain (e.g., music, drawings, text, etc.) for which sample GAI models are to be presented and explored. The client may then learn about AI using models and artifacts of the chosen content type, instead of necessarily having to use music-related models.

Methods for Hands-on AI Education

Figure 13:
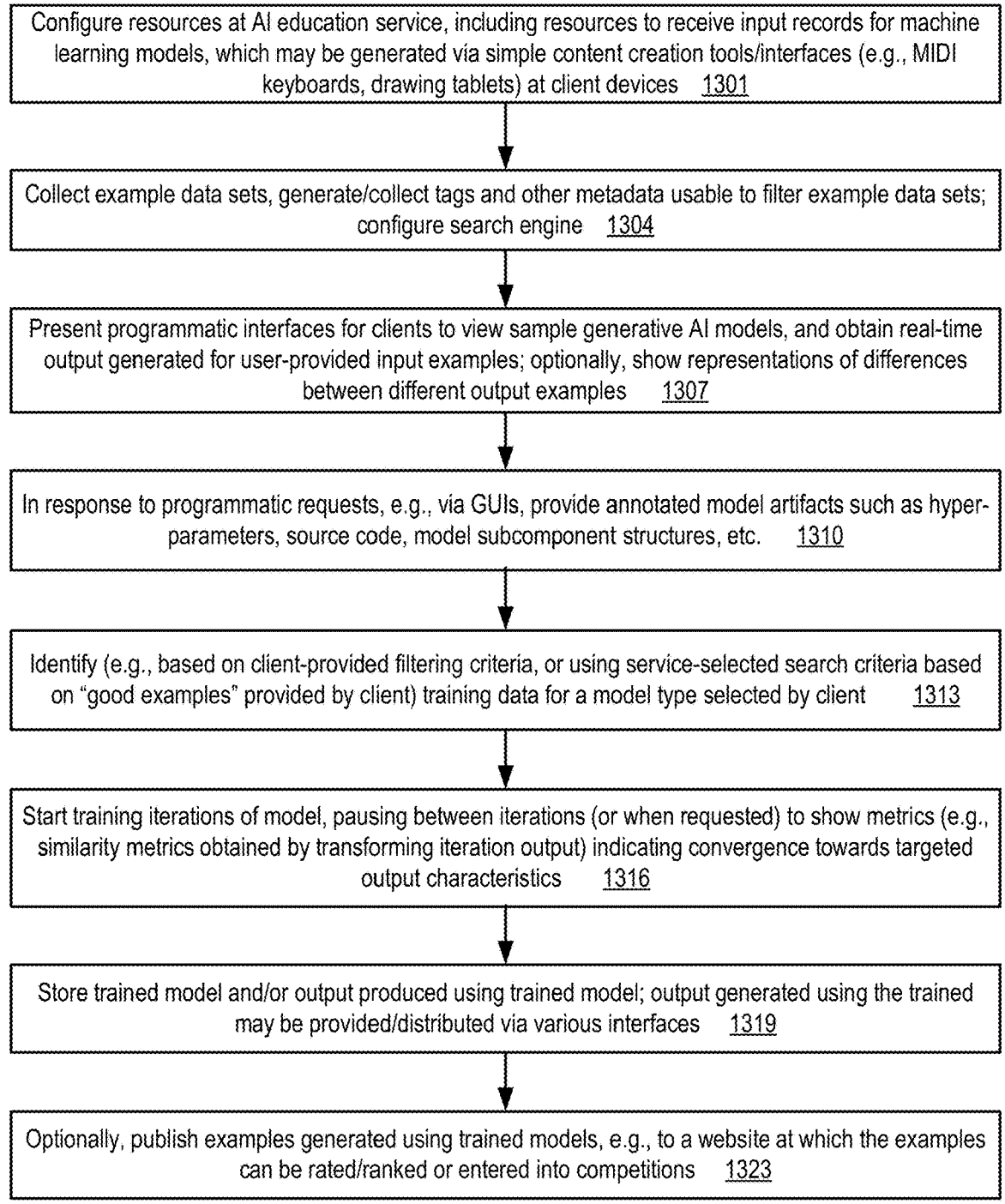
FIG. 13 is a flow diagram illustrating aspects of operations that may be performed at an artificial intelligence education service, according to at least some embodiments.

FIG. 13 is a flow diagram illustrating aspects of operations that may be performed at an artificial intelligence education service, according to at least some embodiments. As shown in element 1301, a set of resources may be configured at a network-accessible artificial intelligence education service (AIES) (similar in features and functionality to AIES 110 of FIG. 1) to enable clients to learn about various types of machine learning techniques, including generative AI models and algorithms. The resources may include input record collectors for recording and capturing input data records submitted by clients for machine learning models of the service. The input records may be created via simple content creation tools, such as music keyboards using MIDI (Musical Instrument Digital Interface), drawing tablets and the like.

A number of data sets or corpuses containing example content items of different types, such as music, visual arts and the like, may be collected by the AIES in some embodiments (element 1304). Metadata such as tags which characterize the content items along various dimensions (such as artist, instruments used, year/decade created, musical or artistic genre, etc.) may be obtained from one or more sources in different embodiments, including for example resources of the public Internet, groups of annotators who are familiar with the creative domain, and so on. One or more search engines may be configured at the AIES, which may utilize indexes created on the metadata to quickly respond to search requests for examples based on client-selected tags and/or descriptions of targeted content.

One or more programmatic interfaces may be presented/generated by the AIES in the depicted embodiment, enabling clients to view a set of sample generative models and obtain (in real-time or near real-time) outputs generated by the sample models (element 1307). For example, a client may submit digital representations of several different music content items to be used as inputs for a given sample model, and be provided representations (e.g., audio playback) of the corresponding synthetic music content items generated by the sample model. Similarly, in at least some embodiments, upon request, a client may be provided the outputs generated by different sample models (which may implement respective algorithms, such as those depicted in FIG. 4) for a given input content item provided/submitted by the client, which may enable the client to get a sense of high-level differences between the algorithms. Optionally, graphical representations of various metrics pertaining to the outputs, including metrics indicating differences between pairs or larger groups of generated output items, may be displayed. The programmatic interfaces may include one or more web-based portals or consoles, graphical user interfaces, command-line tools, APIs and the like.

In response to one or more programmatic requests via the programmatic interfaces, annotated/commented model artifacts pertaining to the sample models (and/or other models including customized models created for a client) may be provided (element 1310) to clients in various embodiments. The artifacts may include, for example, representations of model subcomponents (e.g., the structure of the neural networks used for generators, discriminators and the like in the case of GANs), hyper-parameters, source code, and the like. The client may change the structure (e.g., the number of hidden layers of a neural network) and/or hyper-parameter values of a given model using the AIES interfaces in various embodiments, and view/hear the resulting changes to the output produced by the model.

If and when a client of the AIES decides to train custom models, training data for a model type selected by a client (e.g., from among the types of sample models provided, such as GANs, VAEs and the like) may be identified from among the corpuses available at the AIES (element 1313). Subsets of a corpus that match criteria (specified for example using the tags generated or obtained earlier) may be quickly identified for inclusion in a training data set using the AIES search engine in some embodiments. In some embodiments, specific tags for use as search query attributes may not have to be provided by the client or user; instead, for example, a client may simply provide some "good examples" of content for which similar items are to be identified from the corpuses available, and the AIES may generate its own search query accordingly. A like/dislike interface of the kind discussed earlier may be used to identify such good examples in some embodiments.

In response to one or more programmatic requests, training iterations of a model may be started using the training data identified on behalf of the client (element 1316) in various embodiments. The AIES may, upon request, pause between iterations to display various types of metrics (similar to the subjective and/or objective metrics discussed earlier) which indicate the progress or convergence towards targeted output characteristics. In at least one embodiment in which music items are generated, graphical representations of metrics of similarity or differences between pairs of outputs, produced using structural similarity matrices, multi-dimension scaling and the like may be provided.

A trained version of the model, and/or outputs produced using the model may be stored in a repository of the AIES in some embodiments (element 1319). The stored version may be used to generate additional outputs (e.g., for new input data items, which were not in the training data) which may be distributed over networks to various destinations selected by the client. Optionally, in some embodiments, a client may request that some of the generated output be published (e.g., to content sharing websites or the like, where the output may potentially be rated/ranked by an online audience) or entered into a competition (element 1323). The AIES may facilitate such publishing or competition participation in at least some embodiments, e.g., by providing simplified "one-click" interfaces for propagating the generated content.

It is noted that in various embodiments, some of the operations shown in FIG. 13 may be implemented in a different order than that shown in the figure, or may be performed in parallel rather than sequentially. Additionally, some of the operations shown in FIG. 13 may not be required in one or more implementations.

Use Cases

The techniques described above, of providing a network-accessible service user-friendly interfaces for learning about various aspects of artificial intelligence, including generative artificial intelligence, may be useful in a variety of scenarios. As more and more different types of problems are being addressed using machine learning methodologies, larger pools of developers, data scientists and the like are required to keep pace with demand. By utilizing the described techniques and interfaces, an entertaining and hands-on way of introducing individuals to artificial intelligence techniques, increasing such learners' confidence, and eventually enabling more rapid advances in fields such as disease prediction, engineering design and the like may be made possible.

Illustrative Computer System

Figure 14:
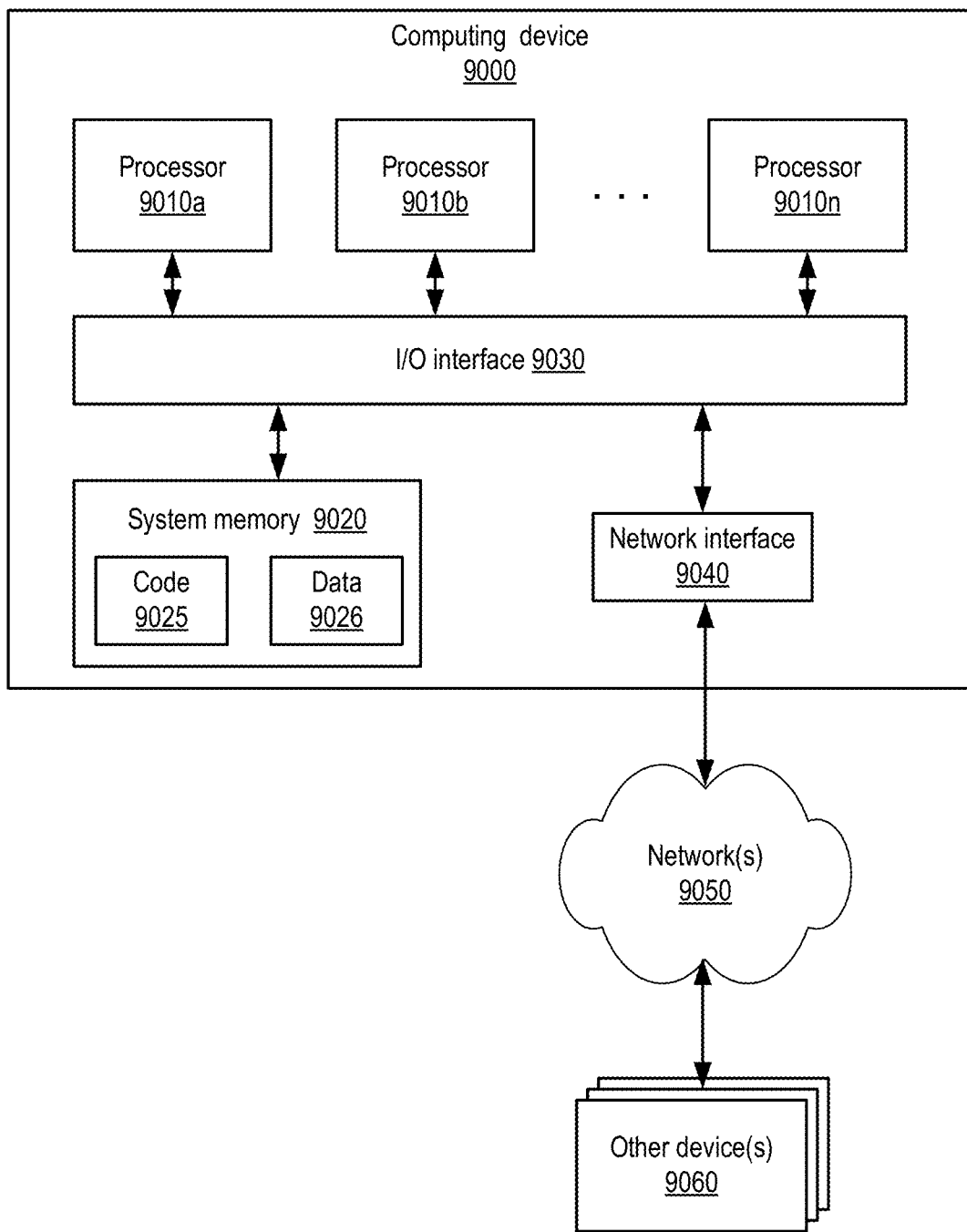
FIG. 14 is a block diagram illustrating an example computing device that may be used in at least some embodiments.

In at least some embodiments, a server that implements one or more of the techniques described herein, including for example components of an artificial intelligence education service, a machine learning service and/or other services of a provider network and the like may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040.

Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across one or more computing devices cause the one or more computing devices to:
   provide, via one or more programmatic interfaces of an artificial intelligence education service, an indication of (a) one or more sample models implementing respective generative machine learning algorithms trained to create synthetic music content items and (b) metadata associated with the one or more sample models, including respective sets of hyper-parameters of the one or more sample models;
   obtain, via the one or more programmatic interfaces, respective digital representations of a first input music content item produced by a client of the artificial intelligence education service, and a second music input content item produced by the client;
   cause to be presented, via the one or more programmatic interfaces, a representation of (a) a first synthetic music content item, generated using a particular set of hyper-parameters at a particular sample model of the one or more sample models in response to the first input music content item and (b) a second synthetic music content item generated at the particular sample model in response to the second input music content item;

cause to be presented, via the one or more programmatic interfaces, an indication of a result of changing a hyper-parameter of the particular set of hyper-parameters, wherein the hyper-parameter is changed in response to a request from the client;

perform, using resources of a provider network, a plurality of training iterations of a generative machine learning model using a training data set, wherein the training data set is selected from a corpus of music content item examples of the provider network, and wherein selection of the training data set is based at least in part on (a) classification metadata provided by the provider network and (b) input obtained from the client via the one or more programmatic interfaces;

cause to be presented, via the one or more programmatic interfaces, at least a graphical representation of a difference between (a) a third synthetic music content item produced by the generative machine learning model in a particular training iteration of the plurality of training iterations and (b) a fourth synthetic music content item produced by the generative machine learning model in a different training iteration of the plurality of training iterations;

store a trained version of the generative machine learning model; and store one or more additional synthetic music content items produced by the trained version.

2. The system as recited in claim 1, wherein the trained version of the generative machine learning model trained comprises one or more of: (a) a generative adversarial network, (b) a variational auto-encoder, (c) an auto-regressive model or (d) a transformer model.

3. The system as recited in claim 1, wherein the one or more computing devices include further instructions that upon execution on or across one or more computing devices further cause the one or more computing devices to:

cause a notebook interface of a machine learning service of the provider network to be presented to the client, wherein the notebook interface enables annotation and exploration of a plurality of machine learning artifacts.

4. The system as recited in claim 1, wherein the one or more computing devices include further instructions that upon execution on or across one or more computing devices further cause the one or more computing devices to:

in response to input received via the one or more programmatic interfaces, modify one or more hyper-parameters of a particular machine learning model to cause a sound of a first musical instrument to be substituted by the sound of a second musical instrument in a synthetic music content item generated by the particular machine learning model.

5. The system as recited in claim 1, wherein the one or more computing devices include further instructions that upon execution on or across one or more computing devices further cause the one or more computing devices to:

cause to be presented, via the one or more programmatic interfaces, a representation of a structure of a neural network of a particular generative machine learning model; and cause the structure to be modified in response to input received via the one or more programmatic interfaces.

6. A computer-implemented method, comprising:

providing, via one or more programmatic interfaces of a service of a provider network, an indication of one or more sample models implementing respective machine learning algorithms trained to create synthetic content items;

causing to be presented, via the one or more programmatic interfaces, a representation of (a) a first synthetic content item, generated using a particular sample model of the one or more sample models in response to a first input content item obtained from a client of the provider network and (b) a second synthetic music content item generated at the particular sample model in response to a second input content item;

in response to one or more messages from the client via the one or more programmatic interfaces, selecting a training data set from a corpus of content item examples of the provider network; and training, using the training data set, a machine learning model to produce synthetic content items.

7. The computer-implemented method as recited in claim 6, wherein a synthetic content item produced by the machine learning model comprises one or more of: (a) a music content item, (b) a writing content item, (c) a synthetic example of medical data, or (d) an animation content item.

8. The computer-implemented method as recited in claim 6, wherein the machine learning model trained using the training data set comprises one or more of: (a) a generative adversarial network, (b) a variational auto-encoder, (c) an auto-regressive model or (d) a transformer model.

9. The computer-implemented method as recited in claim 6, further comprising:

providing, via the one or more programmatic interfaces, an indication of a set of hyper-parameters of a particular machine learning model trained to generate synthetic content items; and causing to be presented, via the one or more programmatic interfaces, an indication of a change in an output synthetic content item of the particular machine learning mode, wherein the change in the output synthetic content item results from a change, requested via the one or more programmatic interfaces, to a particular hyper-parameter of the set of hyper-parameters.

10. The computer-implemented method as recited in claim 6, wherein said training comprises a plurality of training iterations which include a particular iteration and a successor iteration of the particular iteration, the computer-implemented method further comprising:

cause to be presented, via the one or more programmatic interfaces, at least a graphical representation of a difference between (a) a third synthetic content item produced by the machine learning model in the particular iteration and (b) a fourth synthetic content item produced by the machine learning model in the successor iteration, wherein a content type of at least one synthetic content item of the third and fourth synthetic content items is not graphical.

11. The computer-implemented method as recited in claim 6, further comprising:

obtaining, via the one or more programmatic interfaces, an indication of an example content item liked by the client;

identifying, from the corpus, one or more other content items which meet a similarity criterion relative to the example content item; and including the one or more other content items in the training data set.

12. The computer-implemented method as recited in claim 6, wherein the first input content item is obtained from a client of the provider network via a music keyboard interface.

13. The computer-implemented method as recited in claim 6, further comprising:
   obtaining, via the one or more programmatic interfaces, feedback with respect to a particular synthetic content item produced by a particular machine learning model; and
   providing, via the one or more programmatic interfaces, based at least in part on the feedback, a recommendation for a change to a hyper-parameter of the particular machine learning model.

14. The computer-implemented method as recited in claim 6, further comprising:
   obtaining, via the one or more programmatic interfaces, respective requests to explore a plurality of generative machine learning algorithms including a first generative machine learning algorithm and a second generative machine learning algorithm;
   causing to be presented, in response to the respective requests, (a) an indication of a synthetic content item generated in response to a first input by the first generative machine learning algorithm, and (b) an indication of a different synthetic content item generated in response to the first input by the second generative machine learning algorithm.

15. The computer-implemented method as recited in claim 6, further comprising:
   causing to be presented, via the one or more programmatic interfaces, indications of one or more metrics comparing a first synthetic music content item produced by a particular machine learning model with another synthetic music content item, wherein the one or more metrics includes one or more of: (a) a structural similarity matrix, (b) a number of musical instruments used, (c) a type of musical instrument used, (d) a number of voices used, (e) a type of voice used, (f) a pacing of notes, (g) an indication of a number of notes belonging to a particular music genre, or (h) a percussion beat pattern.

16. One or more non-transitory computer-accessible storage media storing program instructions that when executed on or across one or more processors cause the one or more processors to:
   provide, via one or more programmatic interfaces, an indication of one or more sample models implementing respective machine learning algorithms trained to create synthetic content items;
   cause to be presented, via the one or more programmatic interfaces, a representation of a first synthetic content item, generated using a particular sample model of the one or more sample models in response to a first input content item obtained from a client of a provider network; and
   in response to one or more requests received from the client via the one or more programmatic interfaces, train a machine learning model to produce synthetic content items.

17. The one or more non-transitory computer-accessible storage media as recited in claim 16, wherein the machine learning model comprises one or more of: (a) a generative adversarial network, (b) a variational auto-encoder, (c) an auto-regressive model or (d) a transformer model.

18. The one or more non-transitory computer-accessible storage media as recited in claim 16, wherein a synthetic content item produced by the machine learning model comprises one or more of: (a) a music content item, (b) a writing content item, (c) a synthetic example of medical data, or (d) an animation content item.

19. The one or more non-transitory computer-accessible storage media as recited in claim 16, storing further program instructions that when executed on or across one or more processors further cause the one or more processors to:
   in response to a programmatic request from a client, apply one or more filtering criteria to a corpus of content items of a provider network to identify a training data set for the machine learning model.

20. The one or more non-transitory computer-accessible storage media as recited in claim 16, storing further program instructions that when executed on or across one or more processors further cause the one or more processors to:
   cause to be provided, via the one or more programmatic interfaces, respective representations of synthetic content items produced at a plurality of stages of a pipeline of sample machine learning models.

* * * * *